(12) United States Patent
Kang et al.

(10) Patent No.: US 12,190,420 B2
(45) Date of Patent: Jan. 7, 2025

(54) GENERATING USER INTERFACES IN AUGMENTED REALITY ENVIRONMENTS

(71) Applicant: Snap Inc., Santa Monica, CA (US)

(72) Inventors: Shin Hwun Kang, Los Angeles, CA (US); Lien Le Hong Tran, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 170 days.

(21) Appl. No.: 17/959,985

(22) Filed: Oct. 4, 2022

(65) Prior Publication Data

US 2024/0112383 A1 Apr. 4, 2024

(51) Int. Cl.
| | |
|---|---|
| G06T 11/60 | (2006.01) |
| G06F 3/01 | (2006.01) |
| G06F 3/0482 | (2013.01) |
| G06T 7/70 | (2017.01) |

(52) U.S. Cl.
CPC .............. *G06T 11/60* (2013.01); *G06F 3/013* (2013.01); *G06F 3/0482* (2013.01); *G06T 7/70* (2017.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 8,643,680 | B2* | 2/2014 | Baldwin ................. | G06F 3/013 345/581 |
| 2013/0085345 | A1* | 4/2013 | Geisner .................. | G06Q 30/00 600/300 |
| 2016/0378861 | A1* | 12/2016 | Eledath .................. | G06V 20/52 707/766 |
| 2018/0232608 | A1* | 8/2018 | Pradeep ................. | H04L 51/02 |
| 2018/0307761 | A1* | 10/2018 | Felt ....................... | G06F 16/685 |
| 2020/0042520 | A1 | 2/2020 | Kitamorn et al. | |
| 2021/0375048 | A1 | 12/2021 | Kang et al. | |
| 2022/0065651 | A1 | 3/2022 | Beaurepaire et al. | |

FOREIGN PATENT DOCUMENTS

WO 2016014876 1/2016

OTHER PUBLICATIONS

"International Application Serial No. PCT/US2023/075829, International Search Report mailed Dec. 19, 2023", 4 pgs.
"International Application Serial No. PCT/US2023/075829, Written Opinion mailed Dec. 19, 2023", 10 pgs.

* cited by examiner

*Primary Examiner* — Edward Martello
(74) *Attorney, Agent, or Firm* — Schwegman Lundberg & Woessner, P.A.

(57) ABSTRACT

An augmented reality (AR) content system is provided. The AR content system may analyze audio input obtained from a user to generate a search request. The AR content system may obtain search results in response to the search request and determine a layout by which to display the search results. The search results may be displayed in a user interface within an AR environment according to the layout. The AR content system may also analyze audio input to detect commands to perform with respect to content displayed in the user interface.

20 Claims, 12 Drawing Sheets

GENERATING USER INTERFACES IN AUGMENTED REALITY ENVIRONMENTS

TECHNICAL FIELD

The present disclosure relates generally to generating user interfaces in augmented reality environments.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
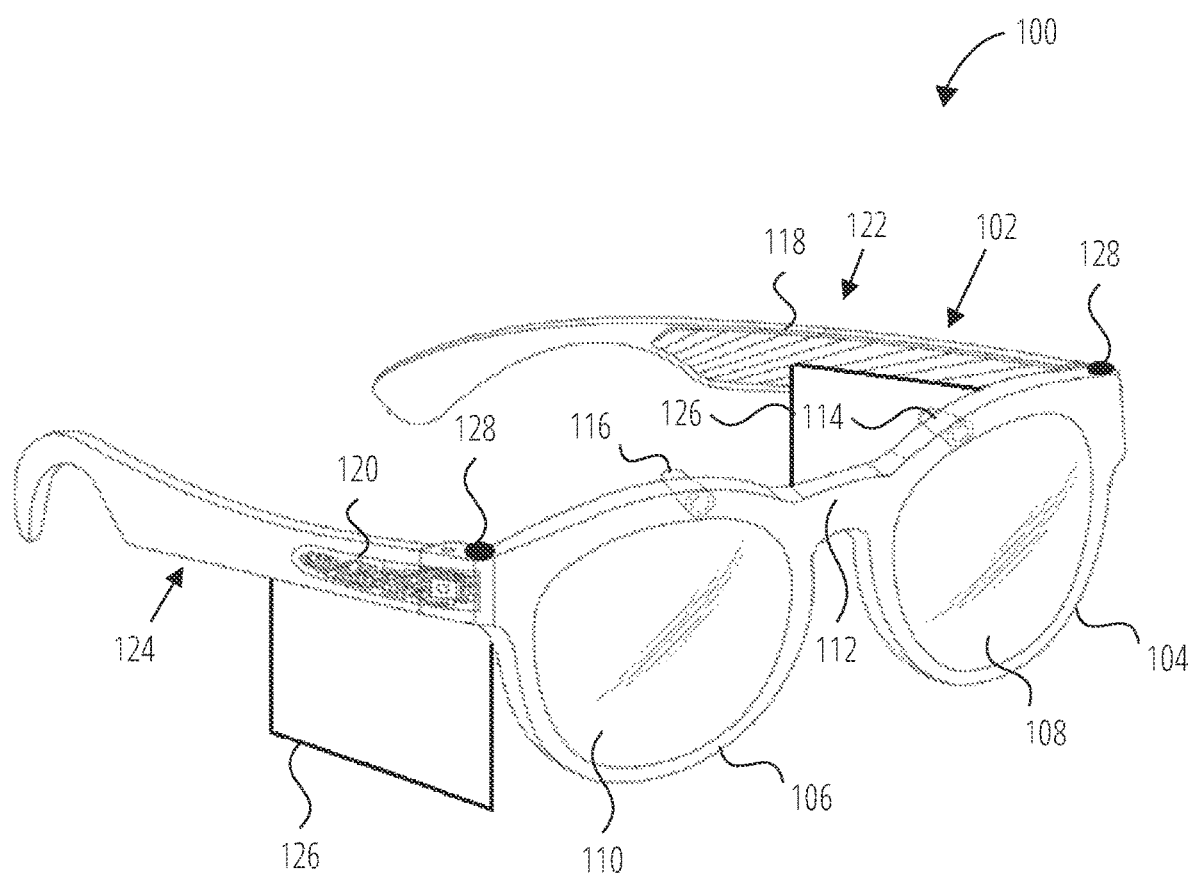
FIG. 1 is a perspective view of a head-worn device, in accordance with one or more examples.

In many augmented reality (AR) systems, users may interact with virtual objects that are displayed in their environment. An input modality that may be utilized with AR systems is hand-tracking combined with Direct Manipulation of Virtual Objects (DMVO) where a user is provided with a user interface that is displayed to the user in an AR overlay having a two-dimensional (2D) or three-dimensional (3D) rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects. Additionally, the AR system may respond to commands provided by users to determine a user's interactions with the virtual objects.

In existing systems, that are commonly not AR systems, users are typically unable to view and interact with objects in their environment while also accessing content via a computing device. For example, in a situation where a user is performing steps of a recipe, the user views the instructions of the recipe on a computing device and then turns their attention away from instructions displayed on the computing device to follow the steps of the recipe, such as by interacting with the recipe ingredients and kitchen tools. Users are unable to view both the instructions of the recipe and the ingredients and kitchen tools used to carry out the instructions of the recipe within their field of view. The same scenario is present with many types of instructional content where a user turns their attention away from the instructions in order to perform the steps included in the instructions.

Additionally, instructional content is often accessed via at least one of continuous videos or a page of text content. In these instances, individual steps of an instructional process are continuously presented to a user. Typically, the user watches a video or reads content and then either stops the video or otherwise stops viewing the instructional content to perform actions related to the instructional process. If the user does not stop the video, the instructional process continues whether or not the user has performed the actions of the instructional process that were previously presented. As a result, the actions that the user is performing become out of sync with the instructions being displayed and users frequently pause or rewind and then play or replay the content.

Implementations of an augmented reality system described herein may enable a user to view content while performing actions of an instructional process without frequently pausing or rewinding content. In one or more examples, the AR system may analyze audio data to determine one or more commands included in the audio data. The one or more commands may be directed to a search request to obtain content related to one or more keywords included in the audio data. In response to the search request, search results including content items may be returned, where the content items may include video content, image content, text content, augmented reality content, audio content, or one or more combinations thereof.

Content included in the content items may also be accessed using audio input. In various examples, content of the content items included in search results may be presented in user interfaces that are displayed in an augmented reality environment. In at least some examples, the user interfaces are displayed in the augmented reality environment using a head-worn computing device. In one or more illustrative examples, the user interfaces may be displayed such that a user may view the user interfaces as well as objects included in a real-world scene. In this way, the user may view instructional content presented in one or more user interfaces while also performing actions of the instructional content with respect to items included in the real-world scene. Thus, in contrast to existing systems, the user is able to transition from viewing instructional content to performing actions related to the instructional content with minimal interruptions.

Further, the AR content system may analyze audio data obtained from the user to navigate through the instructional content. The instructional content may be arranged according to discrete steps of an instructional process. For example, the instructional content is presented using a number of user interfaces where individual user interfaces provide content that corresponds to a discrete step of the instructional process. As a user completes a step of the instructional process, the user may provide audio input that includes commands to navigate to a next step of the instructional process. As a result, the user is able to complete a current step of the instructional process while accessing content of the current step without frequently having to pause the playback of the instructional content to prevent the instructional content from moving on to the next step before the user is ready, as in existing systems.

Other technical features may be readily apparent to one skilled in the art from the following figures, descriptions, and claims.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 1002 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
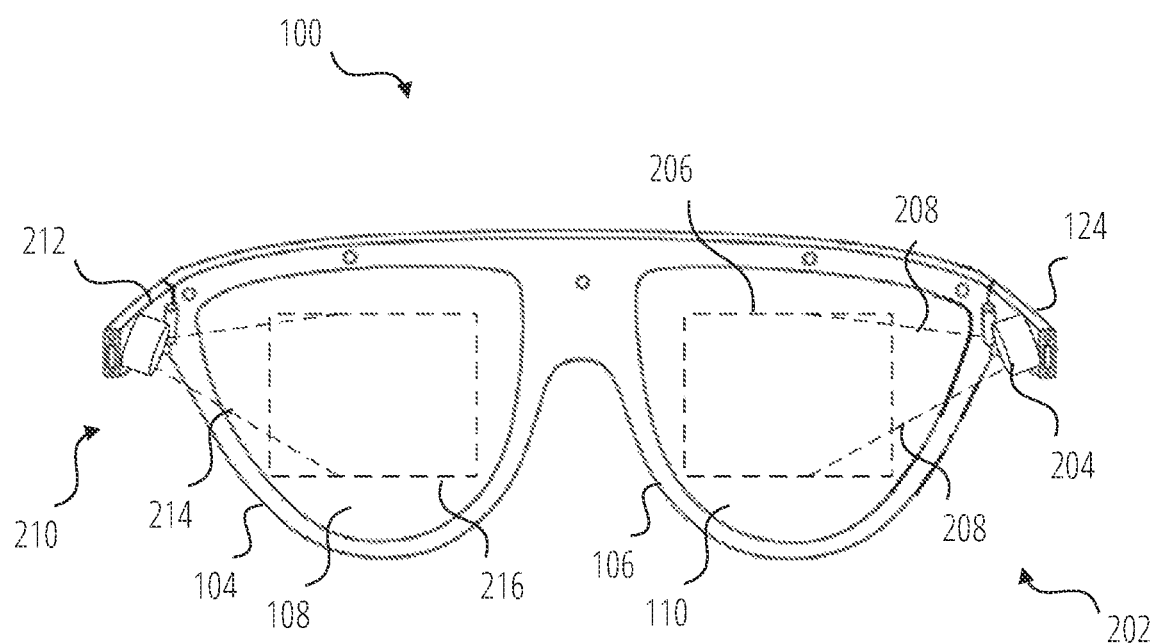
FIG. 2 is a further view of the head-worn device of FIG. 1, in accordance with one or more examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 1026 illustrated in FIG. 9), and/or hand movements, locations, and positions detected by the glasses 100.

Figure 3:
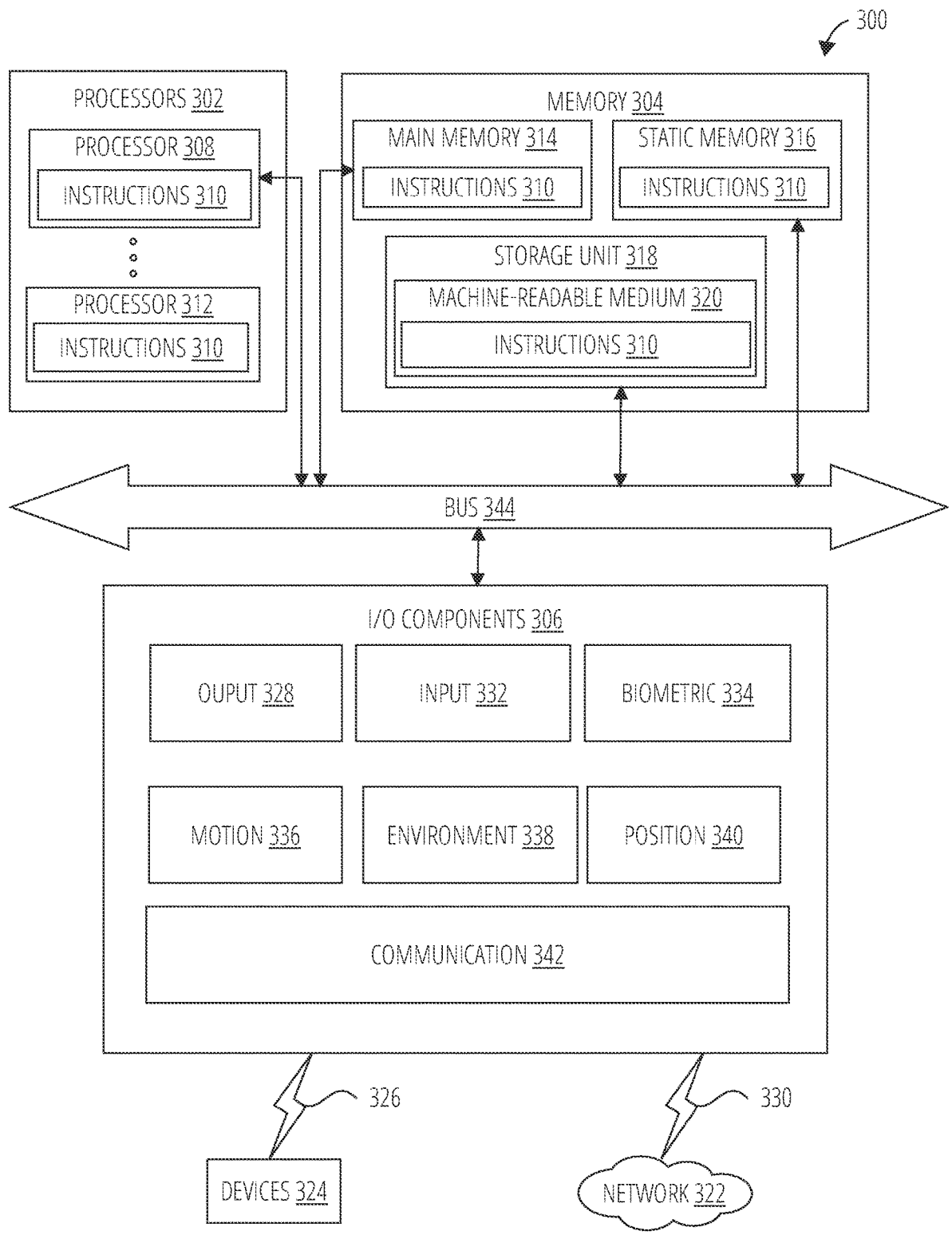
FIG. 3 is a diagrammatic representation of a machine, in the form of a computing apparatus within which a set of instructions may be executed for causing the machine to perform any one or more of the methodologies discussed herein in accordance with one or more examples.

FIG. 3 is a diagrammatic representation of a computing apparatus 300 within which instructions 310 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 310 may cause the computing apparatus 300 to execute any one or more of the methods described herein. The instructions 310 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the computing apparatus 300. Further, while a single computing apparatus 300 is illustrated, the term "machine" may also be taken to include a collection of machines that individually or jointly execute the instructions 310 to perform any one or more of the methodologies discussed herein.

The computing apparatus 300 may include processors 302, memory 304, and I/O components 306, which may be configured to communicate with one another via a bus 344.

In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the computing apparatus 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 306 may include biometric components 334, motion components 336, environmental components 338, and position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units, acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 306 further include communication components 342 operable to couple the computing apparatus 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
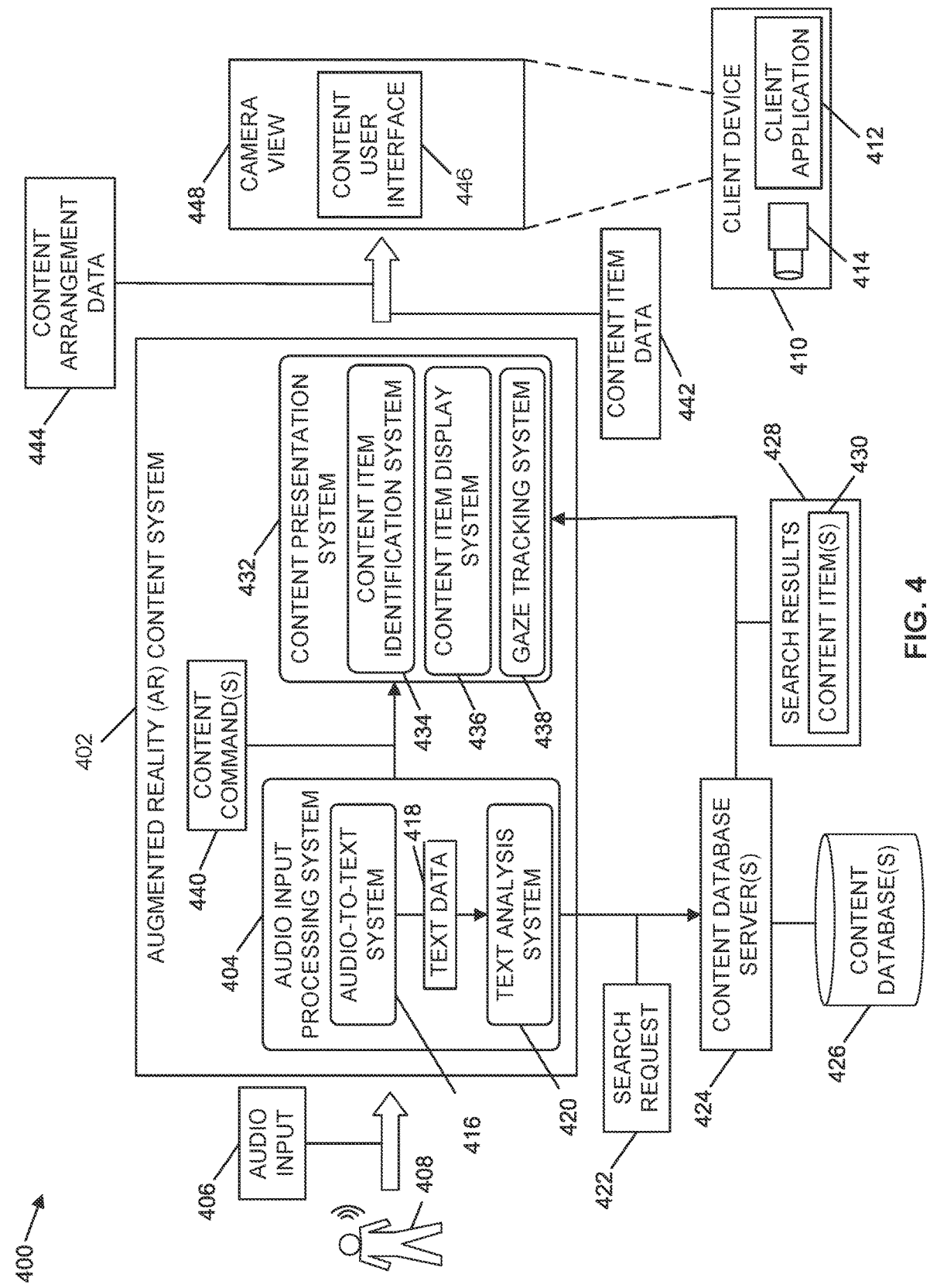
FIG. 4 is a diagram of an environment including one or more systems to determine a layout for a content item and display information of the content item in an augmented reality environment, in accordance with one or more examples.

FIG. 4 is a diagram of an environment 400 including one or more systems to determine a layout for a content item and display information of the content item in an augmented reality environment, in accordance with one or more examples. The environment 400 includes an augmented reality (AR) content system 402. The AR content system 402 may analyze input received from one or more users to obtain content in response to requests of the one or more users. In addition, the AR content system 402 may determine a layout of the content within a user interface based on one or more features of the content. Further, the AR content system 402 may determine locations within a real-world scene to display the content in accordance with the layout. The AR content system 402 may also enable one or more users to interact with the content by providing a number of actions that the one or more users may take with respect to the content.

The AR content system 402 may include an audio input processing system 404 to receive and analyze audio input 406 produced by a user 408. In one or more examples, the audio input 406 may be captured by one or more sensors of a client device 410. For example, the client device 410 includes one or more microphones to capture the audio input 406 produced by the user 408. In at least some examples, the client device 410 begins capturing the audio input 406 in response to one or more activation commands provided by the user 408 that correspond to activating the client device 410 to capture audio data.

The client device 410 may also execute an instance of a client application 412. The processing resources and the memory resources of the client device 410 may execute a number of applications, such as client application 412. In one or more examples, the client application 412 may include messaging functionality that enables users of the client application 412 to send messages to and receive messages from other users of the client application 412. In one or more additional examples, the client application 412 may include social networking functionality that enables users of the client application 412 to share content with other users of the client application 412 and/or to access content created by other users of the client application 412. In one or more illustrative examples, the client application 412 may include at least one of the messaging client 1102 or the application 1104 described in more detail with respect to FIG. 11. In various examples, the audio input 406 may be captured during an instance of the client application 412 being executed by the client device 410.

Additionally, in one or more examples, at least a portion of the operations described with respect to the AR content system 402 may be performed by the client device 410. In one or more further examples, at least a portion of the operations described with respect to the AR content system 402 may be performed by one or more computing devices that are different from the client device 410. To illustrate, at least a portion of the operations described with respect to the AR content system 402 may be performed by a distributed computing system, such as a cloud computing system. In at least some additional examples, the operations described with respect to the AR content system 402 may be performed by a combination of computing devices including the client device 410 and one or more computing devices of a distributed computing system.

In at least some examples, the AR content system 402 may cause augmented reality content to be displayed within a real-world scene. Augmented reality content items may include program code that is executable to perform one or more functions. In various examples, augmented reality content items may be executable within the client application 412. For example, an instance of the client application 412 may be activated by the client device 410 and one or more user interfaces of the client application 412 may be displayed via the client device 410. Augmented reality content items may be selected while viewing one or more user interfaces of the client application 412 and executed to activate one or more functions that correspond to the selected augmented reality content item. In at least some examples, an augmented reality content item may change an appearance of at least one of one or more objects or one or more locations within a real-world scene.

In various examples, the audio input 406 may be captured in response to content provided via the client application 412. To illustrate, the audio input 406 may be captured in response to at least one of audio content, video content, image content, text content, or augmented reality content generated by the client application 412. Additionally, the client device 410 may include one or more cameras, such as a camera 414, to capture at least one of video or image content of a real-world scene in which the user 408 and the client device 410 are located. Video content captured by the camera 414 may comprise at least one of a series of images or a stream of images captured during a period of time. In various examples, the camera 414 may capture video of a real-world scene in response to input from the user 408. The images captured by the camera 414 may be within a field of view of the camera 414. The field of view of the camera 414 may correspond to a portion of an environment that may be imaged by the camera 414 at a given time and may be based on focal length of a lens of the camera 414 and a size of a sensor of the camera 414.

In one or more examples, the client device 410 may include a number of computing devices having processing resources and memory resources. For example, the client device 410 may include at least one of a head-worn device, a wearable device, or a mobile computing device, such as a smart phone. In various examples, the client device 410 may include multiple computing devices that operate in conjunction with one another. To illustrate, a head-worn device may operate in conjunction with at least one of a wearable device or a mobile computing device or a wearable device may operate in conjunction with a mobile computing device. In one or more illustrative examples, the client device 410 may include the glasses 100 of FIG. 1.

The audio input processing system 404 may include an audio-to-text system 416 that analyzes the audio input 406 to generate text data 418 that corresponds to the audio input 406. In one or more examples, the audio input processing system 404 may generate an audio file using the audio input 406 and provide the audio file to the audio-to-text system 416. The audio file may have one or more formats, such as a Moving Picture Experts Group (MPEG) audio layer 3 (MP3) format, an M4A format, a Free Lossless Audio Codec (FLAC) format, a Waveform Audio File (WAV) format, a Windows Media Audio (WMA) format, an Advanced Audio Coding (AAC) format, or one or more combinations thereof. In various examples, the audio input processing system 404 may generate one or more audio files based on the audio input 406 by implementing one or more analog-to-digital conversion technologies. In at least some examples, the audio input processing system 404 may perform one or more pre-processing operations before providing a modified version of the audio input 406 to the audio-to-text system 416. For example, the audio input processing system 404 may perform one or more signal processing techniques to reduce background noise present in the audio input 406.

The audio-to-text system 416 may perform one or more feature extraction operations to generate the text data 418 from the audio input 406. In one or more examples, the audio-to-text system 416 may implement one or more automatic speech recognition (ASR) techniques to generate the text data 418 based on the audio input 406. In at least some examples, the audio-to-text system 416 may implement one or more natural language processing techniques to generate the text data 418 using the audio input 406. In various examples, the audio-to-text system 416 may implement one or more machine learning techniques to generate the text data 418 based on the audio input 406. In one or more illustrative examples, the audio-to-text system 416 may implement one or more Hidden Markov Models to generate the text data 418 according to the audio input 406. In one or more additional illustrative examples, the audio-to-text system 416 may implement one or more neural networks to generate the text data 418 based on the audio input 406. In one or more further illustrative examples, the audio-to-text system 416 may implement one or more deep feedforward neural networks to generate the text data 418 that corresponds to the audio input 406.

The audio input processing system 404 may also include a text analysis system 420 that analyzes the text data 418. The text analysis system 420 may analyze the text data 418 to identify one or more keywords included in the text data 418. In one or more examples, the text analysis system 420 may determine a measure of similarity between at least one of words or phrases included in the text data 418 with respect to one or more keywords. The text analysis system 420 may determine the measure of similarity based on at least one of a number of letters or an order of letters of one or more words in the text data 418 in relation to an arrangement of letters of one or more keywords. In scenarios where the measure of similarity between one or more words included in the text data 418 and one or more keywords is at least a threshold measure of similarity, the text analysis system 420 determines that the one or more keywords are included in the audio input 406.

In one or more additional examples, keywords recognized by the AR content system 402 may be associated with one or more additional words or phrases that have a meaning similar to the meaning of the keywords. In these situations, the text analysis system 420 determines a measure of similarity between a meaning of one or more words included in the text data 418 in relation to a meaning of one or more keywords. For example, the text analysis system 420 analyzes one or more words included in the text data 418 with respect to one or more keywords and a group of synonyms that correspond to the one or more keywords. In one or more further examples, the text analysis system 420 may implement one or more machine learning techniques to determine whether or not a meaning of one or more words included in the text data 418 correspond to one or more keywords recognized by the AR content system 402. To illustrate, the text analysis system 420 may implement one or more natural language processing techniques to determine that at least a portion of the text data 418 at least one of includes one or more keywords or includes one or more words that correspond to a meaning of one or more keywords. In one or more illustrative examples, the text analysis system 420 may implement one or more neural networks to determine that at least a portion of the text data 418 at least one of include one or more keywords or includes one or more words that correspond to a meaning of one or more keywords.

In various examples, the AR content system 402 may recognize keywords that cause the AR content system 402 to perform a number of different actions. In one or more examples, the keywords recognized by the AR content system 402 may be related to retrieving content from one or more sources, where the content is accessible using the client application 412. In one or more additional examples, the keywords recognized by the AR content system 402 may be related to the rendering and displaying of content in one or more user interfaces displayed via the client application 412. In one or more illustrative examples, the keywords recognized by the AR content system 402 may be directed to the retrieval of content and the rendering and displaying of the content in an augmented reality environment using user interfaces generated by the client application 412. For example, the AR content system 402 recognizes a number of keywords that correspond to the retrieval of content that is displayed within a real-world scene. The AR content system 402 may recognize one or more first keywords that correspond to commands to retrieve content from one or more data sources and one or more second keywords that correspond to commands related to the display of augmented reality content in a real-world scene. In addition to commands, the text analysis system 420 may also determine one or more additional keywords included in the audio input 406. To illustrate, in situations where the text analysis system 420 determines that the audio input 406 includes one or more commands to retrieve content from one or more content sources, the text analysis system 420 determines one or more additional keywords included in the audio input 406 that correspond to features of the content to be retrieved. For example, the one or more additional keywords may correspond to search terms related to content that the user 408 desires to retrieve.

In response to determining that the audio input 406 includes one or more keywords related to the retrieval of content, the audio input processing system 404 may generate a search request 422. The search request 422 may include one or more search terms that are included in the audio input 406. The audio input processing system 404 may send the search request 422 to one or more content database servers 424. The one or more content database servers 424 may be at least one of physically or logically coupled to one or more content databases 426. The one or more content databases 426 may store content that may be displayed via one or more user interfaces generated in conjunction with the client application 412. The one or more content databases 426 may store at least one of text content, image content, video content, audio content, or augmented reality content that may be accessed using the client application 412.

The one or more content database servers 424 may at least one of manage, control, or maintain the storage and retrieval of content from the one or more content databases 426. In one or more examples, the one or more content databases 426 may be at least one of controlled, maintained, or managed by one or more content providers. In one or more illustrative examples, the one or more content databases 426 may include a first content database that is at least one of controlled, maintained, or managed by a first content provider and a second content database that is at least one of controlled, maintained, or managed by a second content provider. In various examples, the one or more content databases 426 may be at least one of controlled, maintained, or managed by one or more search engines.

The one or more content database servers 424 may analyze the search request 422 and generate search results 428 in response to the search request 422. The search results 428 may indicate one or more content items 430 that satisfy one or more criteria included in the search request 422. For example, the one or more content items 430 included in the search results 428 may be related to one or more search terms included in the search request 422. In various examples, the search results 428 may include an ordered list of the one or more content items 430. In one or more illustrative examples, the search request 422 may include a phrase such as "How to ride a bike?". In this situation, the one or more content items 430 included in the search results 428 may include at least one of webpages, videos, message content, social media posts, or other content related to learning to ride a bicycle.

The AR content system 402 may include a content presentation system 432 that determines one or more arrangements for content included in the one or more content items 430 within user interfaces displayed by the client device 410 in a real-world scene. The content presentation system 432 may include a content item identification system 434 to determine one or more characteristics of the one or more content items 430. In one or more examples, the content item identification system 434 may determine one or more content formats related to the one or more content items 430. The one or more content formats may correspond to at least one of one or more file types of the one or more content items 430 or one or more technologies used to access content of the one or more content items 430. Technologies used to access content of the one or more content items 430 may correspond to one or more software technologies implemented to access content of the one or more content items 430, one or more hardware technologies implemented to access content of the one or more content items 430, or one or more combinations thereof. In one or more examples, the content item identification system 434 may determine that the one or more content items 430 include at least one of text content, audio content, image content, video content, or augmented reality content.

The content presentation system 432 may also include a content item display system 436 that determines one or more layouts for content included in the one or more content items 430 based on characteristics of the one or more content items 430 determined by the content item identification system 434. For example, the content item display system 436 determines that one or more content items 430 that include text content may be arranged according to one or more first layouts. In addition, the content item display system 436 may determine that one or more content items 430 that include a combination of text content and image content may be arranged according to one or more second layouts. Further, the content item display system 436 may determine that one or more content items 430 that include a combination of text content and video content may be arranged according to one or more third layouts. In still further examples, the content item display system 436 may determine that one or more content items 430 that include augmented reality content may be arranged according to one or more fourth layouts. The content item display system 436 may also determine that one or more content items 430 that include augmented reality content in combination with at least one of text content, video content, or image content may be arranged according to one or more fifth layouts.

In various examples, the content item display system 436 may determine a layout of a user interface for content included in the one or more content items 430 based on a respective source of the one or more content items 430. In one or more examples, individual sources of content items may generate content items having one or more characteristics, such as generating content items including content having one or more formats and/or content having one or more arrangements. The content item display system 436 may determine a layout for content items 430 having one or more features where the layout includes a section within a user interface for one or more types of content. For example, the content item display system 436 identifies one or more layouts for the one or more content items 430 that have one or more sections of a user interface for text content, one or more sections of a user interface for video content, one or more sections of a user interface for image content, one or more sections of a user interface for augmented reality content, or one or more combinations thereof. In one or more illustrative examples, a content source may provide content items having video content and text content. In these scenarios, the content item display system 436 determines a layout for the content items that includes a first section within a user interface to display the video content and a second section within the user interface to display the text content.

In one or more illustrative examples, the one or more content items 430 may include instructional content. In these scenarios, content included in the one or more content items 430 may include a number of actions to be performed by the user 408. For example, the one or more content items 430 include instructional content related to one or more recipes, instructional content related to performing vehicle maintenance, instructional content related to repair of objects that are not functioning properly, instructional content related to building objects, other how-to content, and so forth. In various examples, the one or more content items 430 may be arranged such that at least one of video content, text content, audio content, image content, or augmented reality content are presented in discrete steps that are ordered in a manner to achieve a desired result. To illustrate, a content item 430 may be related to a recipe to bake bread that includes four steps. In one or more examples, the content item 430 may include first text content and first video content directed to the first step, second text content and second video content related to the second step, third text content and third video content related to the third step, and fourth text content and fourth video content related to the fourth step. In these scenarios, the content item display system 436 causes the content related to the individual steps to be accessed via a respective user interface of the client application 412 in a sequential order.

In at least some examples, at least a portion of the one or more content databases 426 may include one or more curated databases that store instructional content that has been arranged such that individual steps of a process are accessible in discrete portions. The one or more content databases 426 that store curated content may be produced by one or more third-party content sources. In addition, a service provider that at least one of controls, maintains, administers, or creates the client application 412 may obtain instructional content from one or more content sources and modify the content obtained from the one or more content sources such that the content is arranged according to individual steps that are accessible in discrete portions and stored in the one or more content databases 426.

In one or more further examples, the one or more content items 430 may include instructional content without being partitioned to have a number of steps that are arranged in discrete portions. In these instances, the content item display system 436 modifies the one or more content items 430 such that modified versions of the one or more content items 430 include a number of portions with individual portions corresponding to a discrete step of the instructional content. For example, the content item display system 436 analyzes the one or more content items 430 and determine that a content item 430 includes instructional content. To illustrate, the content item display system 436 may analyze at least one of words, phrases, or images included in at least one of text content, image content, or video content, to determine that the content item 430 includes instructional content. In one or more illustrative examples, the content item display system 436 may determine a measure of similarity between at least one of words, phrases, or images of the content item 430 with respect to at least one of words, phrases, or images of content items that have previously been identified as having instructional content. In various examples, the content item display system 436 may implement one or more machine learning techniques to generate one or more models based on training data that includes content items that have been previously identified as having instructional content. The one or more models may be executed to determine the measure of similarity. In situations where the measure of similarity is at least a threshold measure of similarity for the content item 430, the content item display system 436 determines that the content item 430 includes instructional content.

In response to determining that a content item 430 includes instructional content, the content item display system 436 may determine portions of the content item 430 that correspond to discrete steps of an instructional process. In one or more examples, the content item display system 436 may determine sections of text content included in the content item 430 that correspond to individual steps of an instructional process. The content item display system 436 may also determine images included in the content item 430 that correspond to individual steps of an instructional process. Further, the content item display system 436 may also determine one or more sections of video content that correspond to individual steps of the instructional process. For example, the content item display system 436 determines beginning time stamps and ending time stamps for sections of video content included in the content item 430 that correspond to individual steps in an instructional process. Additionally, the content item display system 436 may determine augmented reality content items included in the content item 430 that correspond to individual steps of an instructional process.

In one or more illustrative examples, the content item display system 436 may implement one or more machine learning techniques to determine discrete portions of the content item 430 that correspond to individual instructional steps. The one or more machine learning techniques may be implemented by the content item display system 436 to generate one or more models based on training data. The training data may include at least one of content items or portions of content items where discrete portions of at least one of the content items or portions of the content items correspond to individual steps of an instructional process. In at least some examples, the content item display system 436 may generate a number of computational models using one or more machine learning techniques that correspond to different types of instructional content. To illustrate, the content item display system 436 may generate a first computational model that corresponds to identifying discrete portions of content items that correspond to individual steps of a recipe and a second computational model that corresponds to identifying discrete portions of content items that correspond to individual steps of an instructional process to build furniture.

In response to determining portions of a content item 430 that correspond to individual steps of an instructional process, the content item display system 436 may arrange the discrete portions of the content item 430 such that the discrete portions of the content item 430 are accessible via the client application 412 according to a sequence that corresponds to the instructional process. For example, the content item display system 436 generates first user interface data that includes a first portion of a content item 430 corresponding to a first step of an instructional process and second user interface data that includes a second portion of the content item 430 corresponding to a second step of the instructional process. The content item display system 436 may also generate metadata indicating an order in which the portions of the content item 430 are to be displayed. To illustrate, the content item display system 436 may generate metadata indicating that the second user interface is displayed after the first user interface.

In a number of additional implementations, the content item display system 436 may determine a location within a real-world scene in which to display content of a content item 430. In one or more examples, the content item display system 436 may cause one or more user interfaces to be displayed with respect to one or more locations within a real-word scene, where the one or more user interfaces include content included in a content item 430. In various examples, the content item display system 436 may determine that a location to display content of a content item 430 corresponds to a gaze of the user 408. In one or more illustrative examples, the AR content system 402 may include a gaze tracking system 438 that determines a location of a field of view of the gaze of the user 408. In at least some examples, the gaze tracking system 438 may analyze camera data obtained from the client device 410 to determine a location of a gaze of the user 408. Additionally, the gaze tracking system 438 may analyze data obtained from one or more inertial measurement unit (IMU) sensors to determine a location of a gaze of the user 408. Further, the gaze tracking system 438 may analyze camera data obtained from one or more cameras external to the client device 410 to determine a location of a gaze of the user 408. In one or more illustrative examples, the gaze tracking system 438 may determine at least one of a field of view of the user 408 or a center of the field of view of the user 408 and provide the gaze tracking information to the content item display system 436. The content item display system 436 may then cause content of a content item 430 to be displayed within the field of view of the user 408, such as at a center location of the field of view of the user 408.

In one or more examples, as the gaze of the user 408 changes, the gaze tracking system 438 may determine a new location of the field of view of the gaze of the user 408 and provide the new location of the gaze of the user 408 to the content item display system 436. The content item display system 436 may then move the location within a real-world scene in which content of a content item 430 is displayed. In one or more additional examples, the location within a real-world scene where content of the content item 430 is displayed may be a fixed location. The fixed location may be determined by the content item display system 436 based on input from the user 408. Additionally, the fixed location may correspond to an object located in the real-world scene. In these scenarios, the content item display system 436 implements one or more object recognition techniques to identify one or more objects located in the real-world scene. For example, the content item display system 436 analyzes information captured by one or more cameras 414 of the client device 410 to determine objects that may be suitable for the display of content. To illustrate, the content item display system 436 may analyze information captured by one or more cameras 414 of the client device 410 to identify a television, a wall, a table, a screen, an appliance, or another surface on which content may be displayed. The object identified by the content item display system 436 on which to display content may be related to subject matter included in the content. In one or more illustrative examples, the content item display system 436 may determine that content related to a recipe is to be displayed on a refrigerator or other appliance or that media content, such as a movie or television show, is to be displayed on a television.

In various examples, the audio input processing system 404 may provide one or more content commands 440 to the content presentation system 432. The one or more content commands 440 may be related to one or more actions that may be performed by the client application 412 with respect to content included in the one or more content items 430. For example, the one or more content commands 440 may be related to selection of one or more user interface elements included in one or more user interfaces displayed using the client application 412. To illustrate, the client application 412 may display a user interface in an augmented reality environment that includes the search results 428 generated in response to a search request 422. The user interface may include a user interface element, such as an icon, that corresponds to an individual content item 430 included in the search results 428, where the user interface elements are selectable to cause the client application 412 to display a user interface in an augmented reality environment that includes content of the selected content item 430.

The one or more content commands 440 may also be related to the display of content included in one or more user interfaces generated with respect to the client application 412 and displayed in an augmented reality environment. In one or more examples, the one or more content commands 440 may be related to actions that modify display characteristics of content included in one or more user interfaces displayed in conjunction with the client application 412, such as one or more content magnification operations that at least one of increase or decrease the appearance of content displayed in the one or more user interfaces. Additionally, the one or more content commands 440 may be related to a location within a real-world scene to display content. For example, the one or more content commands 440 are related to causing content to be displayed in a fixed location or to move with the gaze of the user 408. Further, the one or more content commands 440 may be related to navigating through content included in a content item 430. In various examples, the one or more content commands 440 may be directed to selecting one or more options from one or more menus of options that correspond to navigating through content included in the one or more content items 430. In one or more illustrative examples, a content item 430 may include instructional content and the one or more content commands 440 may be related to accessing at least one of one or more next steps or one or more previous steps in an instructional process with respect to a current step of the instructional process.

In one or more examples, a set of commands may be available to be selected based on the content being displayed in a user interface. For example, the AR content system 402 determines that a first user interface including the search results 428 is to be displayed. The AR content system 402 may then identify a first set of commands that corresponds to interacting with the search results 428, such as selecting one or more of the content items 430 of the search results 428. In these scenarios, the AR content system 402 may cause the first user interface to be displayed that includes the search results 428 and at least a portion of the first set of commands. In at least some examples, the AR content system 402 may recognize the first set of commands for a period of time that the first user interface is displayed. In response to navigating to a second user interface, the AR content system 402 may then recognize a second set of commands. To illustrate, after selection of a content item 430 included in the search results 428, content of the content item 430 may be displayed in a second user interface. The AR content system 402 may determine a second set of commands that corresponds to the second user interface and display at least a portion of the second set of commands in the second user interface in conjunction with content of the selected content item. In one or more illustrative examples, the second set of commands may correspond to at least one of setting one or more locations to display the additional user interface in a real-world scene, modifying one or more display characteristics of the content item 430 in the additional user interface, or navigating through instructional content of the content item 430. In these situations, the second set of commands may be recognized by the AR content system 402 during a period of time that the second user interface is displayed. In various examples, the AR content system 402 may not recognize the second set of commands during a period of time that the first user interface is being displayed and the may not recognize the first set of commands during a period of time that the second user interface is being displayed. In this way, processing and memory resources of the AR content system 402 may be minimized.

In at least some examples, the one or more content commands 440 may be determined by the text analysis system 420. For example, in addition to analyzing the text data 418 to identify terms of a search request 422, the text analysis system 420 analyzes the text data 418 to identify at least one of words or phrases that correspond to the one or more content commands 440. For example, the text analysis system 420 analyzes the text data 418 with respect to one or more keywords that correspond to the one or more content commands by determining a measure of similarity between at least one of words or phrases included in the text data and at least one of words or phrases of the one or more content commands 440. In one or more additional examples, the text analysis system 420 may determine a measure of similarity between a meaning of one or more words included in the text data 418 in relation to a meaning of one or more keywords related to the one or more content commands 440.

In one or more illustrative examples, the AR content system 402 may analyze audio input 406 obtained from the user 408 and determine content to provide to the user 408 in response to the audio input 406. The AR content system 402 may also determine an arrangement of the content within one or more user interfaces. In various examples, the AR content system 402 may generate content item data 442 that corresponds to one or more content items 430 identified by the AR content system 402 based on the audio input 406. Additionally, the AR content system 402 may generate content arrangement data 444 that corresponds to a layout of content included in the one or more content items 430 included in the content item data 442. The content item data 442 and the content arrangement data 444 may be used to generate one or more content user interfaces 446. The one or more content user interfaces 446 may include content included in the content item data 442 that is displayed according to a layout that corresponds to the content arrangement data 444. In one or more examples, the content user interface 446 may be displayed within a camera view 448 of the client device 410. To illustrate, the content user interface 446 may be displayed within an augmented reality environment, such that the user 408 may view content included in the content user interface 446 in addition to objects included in a real world scene in which the user 408 is located.

In various examples, the content item data 442 may include instructional content that is divided into a number of discrete sections that correspond to steps of an instructional process. The instructional content may be arranged in the content user interface 446 based on one or more formats of instructional content included in the content item data 442. For example, the content arrangement data 444 indicates at least one of a section of the content user interface 446 in which to display text content included in the content item data 442, a section of the content user interface 446 in which to display image content included in the content item data 442, a section of the content user interface 446 in which to display video content included in the content item data 442, or a section of the content user interface 446 in which to display augmented reality content included in the content item data 442. In one or more examples, as the user navigates through the instructional content included in the content item data 442, the content displayed within the content user interface 446 may be modified. To illustrate, as the user 408 navigates from a first step of the instructional content to a second step of the instruction content, the content user interface 446 may be modified from displaying at least one of text content, video content, image content, or augmented reality content of the first step of the instructional content to displaying at least one of text content, video content, image content, or augmented reality content of the second step of the instructional content.

Further, the location of the content user interface 446 within the real-world scene may be fixed in one or more scenarios. In one or more examples, the content user interface 446 may be displayed in relation to a location in real-world space of an object, such as a wall or television. In one or more additional examples, the location of the content user interface 446 within a real-world scene may correspond to a fixed location indicated by the user 408. For example, the user 408 provides a command to fix the location of the content user interface 446 within a real-world scene. Additionally, a location of the content user interface 446 within a real-world scene may be modified. To illustrate, as a gaze of the user 408 changes, the location of the content user interface 446 within the real-world scene may move to track the location of the gaze of the user 408.

Figure 5:
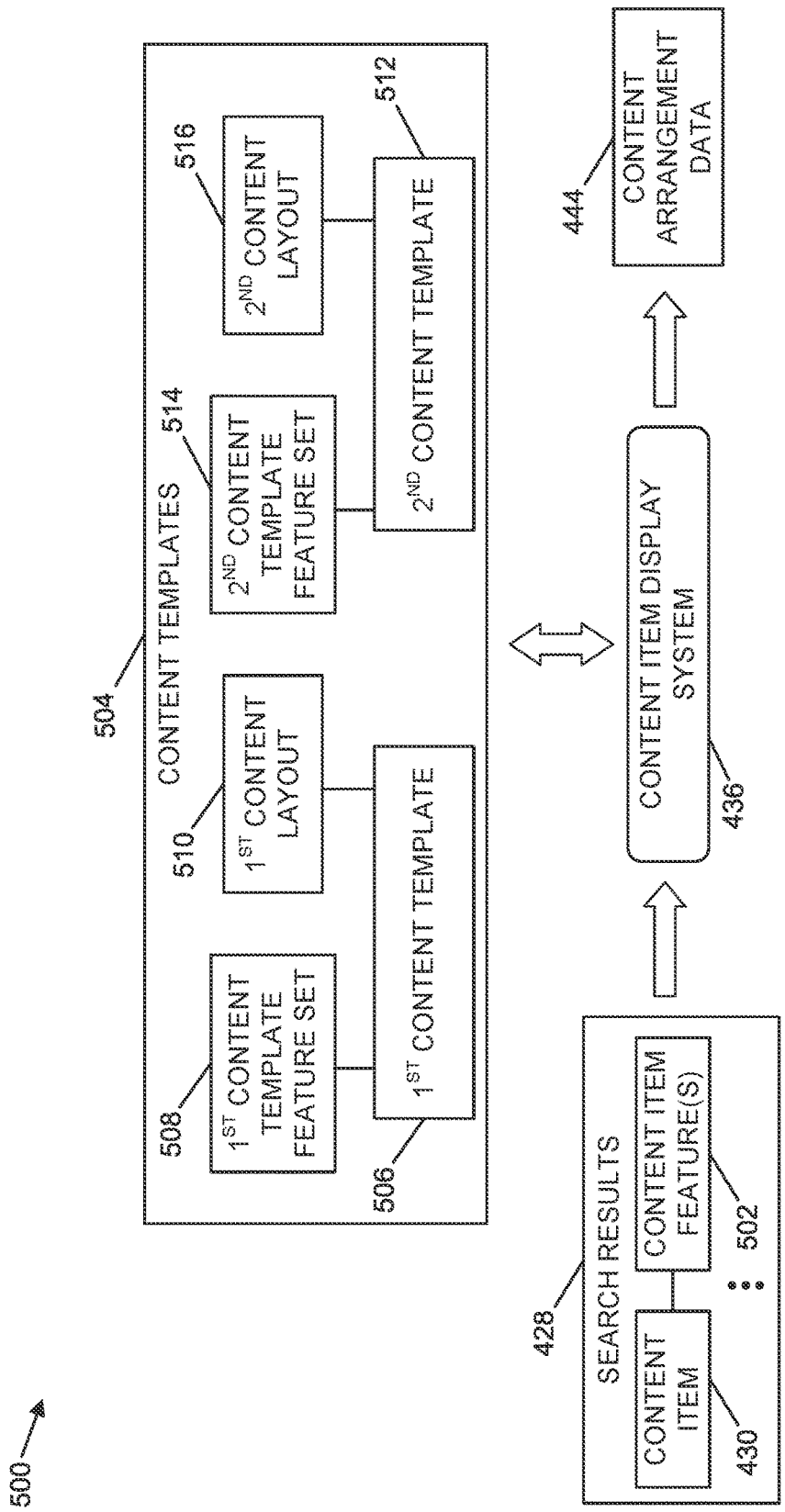
FIG. 5 is a diagram of an architecture including a system to determine a content template to arrange information displayed in a user interface of an augmented reality environment, in accordance with one or more examples.

FIG. 5 is a diagram of an architecture 500 including a system to determine a content template to arrange information displayed in a user interface in an augmented reality environment, in accordance with one or more examples. The architecture 500 may include the content item display system 436. In one or more examples, the content item display system 436 may analyze the search results 428 to generate content arrangement data 444 that indicates locations of one or more portions of content items to be displayed within a content user interface. For example, individual content items 430 included in the search results 428 have one or more content item features 502. In one or more examples, the content item display system 436 may generate the one or more content item features 502 by analyzing the content item 430. In one or more additional examples, the one or more content item features 502 may be indicated in metadata that is provided to the AR content system 402 in conjunction with the search results 428.

The one or more content item features 502 may indicate one or more formats of content included in the content item 430. To illustrate, the content item features 502 may indicate that the content item 430 includes at least one of text content, image content, video content, or augmented reality content. The one or more content item features 502 may also indicate a source of the content item 430. The source of the content item 430 may indicate a content provider that generates the search results 428 and provides the content items 430 included in the search results 428. In one or more illustrative examples, the source of the content item 430 may include an ecommerce service provider, a media content provider, a social networking content provider, a search engine, one or more combinations thereof, and the like.

The content item display system 436 may analyze the one or more content item features 502 to generate the content arrangement data 444. In one or more examples, the content item display system 436 may analyze the one or more content item features 502 with respect to features of a number of content templates 504. The number of content templates 504 may include different layouts of content within a user interface based on one or more features of the content being displayed via the user interface. In various examples, the content templates 504 may indicate positions for different formats of content. For example, a first content template 506 corresponds to a first content template feature set 508 and have a first content layout 510. In addition, a second content template 512 may correspond to a second content template feature set 514 and have a second content layout 516. In various examples, the first content layout 510 may include a first arrangement of sections of a content user interface for displaying at least one of text content, video content, image content, or augmented reality content and the second content layout 516 may include a second arrangement of sections of a content user interface for displaying at least one of text content, video content, image content, or augmented reality content.

In one or more illustrative examples, the first content template 506 may correspond to a first content source, such as an ecommerce source, that may provide content items that include image content and text content. For example, content items 430 obtained from the first source include one or more images related to a product as well as text content related to the product, such as a product description, product reviews, and so forth. In these scenarios, the first content layout 510 indicates a first section of a content user interface to display the text content and a second section of the content user interface to display the image content. In one or more additional illustrative examples, the second content template 512 may correspond to a second content source, such as a video content provider, that may provide content items that include video content and text content. To illustrate, the content items 430 obtained from the second source may include one or more videos and text content related to the one or more videos, such as a summary of the videos, comments related to the videos, and the like. In these situations, the second content layout 516 indicates a first section of a content user interface to display the video content and a second section of the content user interface to display the text content.

Although not shown in the illustrative example of FIG. 5, the content templates 504 may include at least a third content template. In one or more examples, the third content template may correspond to a third content source, such as a social media content provider, that provides content items that include text content and at least one of video content, image content, or augmented reality content. In various examples, content items 430 obtained from a social media content provider may include text content that corresponds to a social media post or social media message, such as a description related to the social media post, a comment related to the social media post, and so forth, and at least one of one or more images, one or more videos, or one or more augmented reality content items related to the social media post or the social media message. In these instances, the third layout may include a section to display the text content in a content user interface and at least one additional section to display at least one of video content, image content, or augmented reality content in the content user interface.

The content item display system 436 may analyze the one or more content item features 502 with respect to the first content template feature set 508 and the second content template feature set 514 to determine a content layout to apply to the content item 430. In one or more examples, the content item display system 436 may determine a first measure of similarity between the one or more content item features 502 and the first content template feature set 508 and a second measure of similarity between the one or more content item features 502 and the second content template features set 514. The content item display system 436 may analyze the first measure of similarity and the second measure of similarity with respect to a threshold to determine whether to display content included in the content item 430 in accordance with the first content template 506 or the second content template 512. In one or more additional examples, the content item display system 436 may determine a ranking based on a first value of the first measure of similarity and a second value of the second measure of similarity to determine whether to display content of the content item 430 in accordance with the first content template 506 or the second content template 512. After determining whether to display content of the content item 430 based on the first content template 506 or the second content template 512, the content item display system 436 may generate the content arrangement data 444. For example, the content item display system 436 may generate the content arrangement data 444 to include the first content template 506 or the second content template 512 based on the first measure of similarity or the second measure of similarity.

Figure 6:
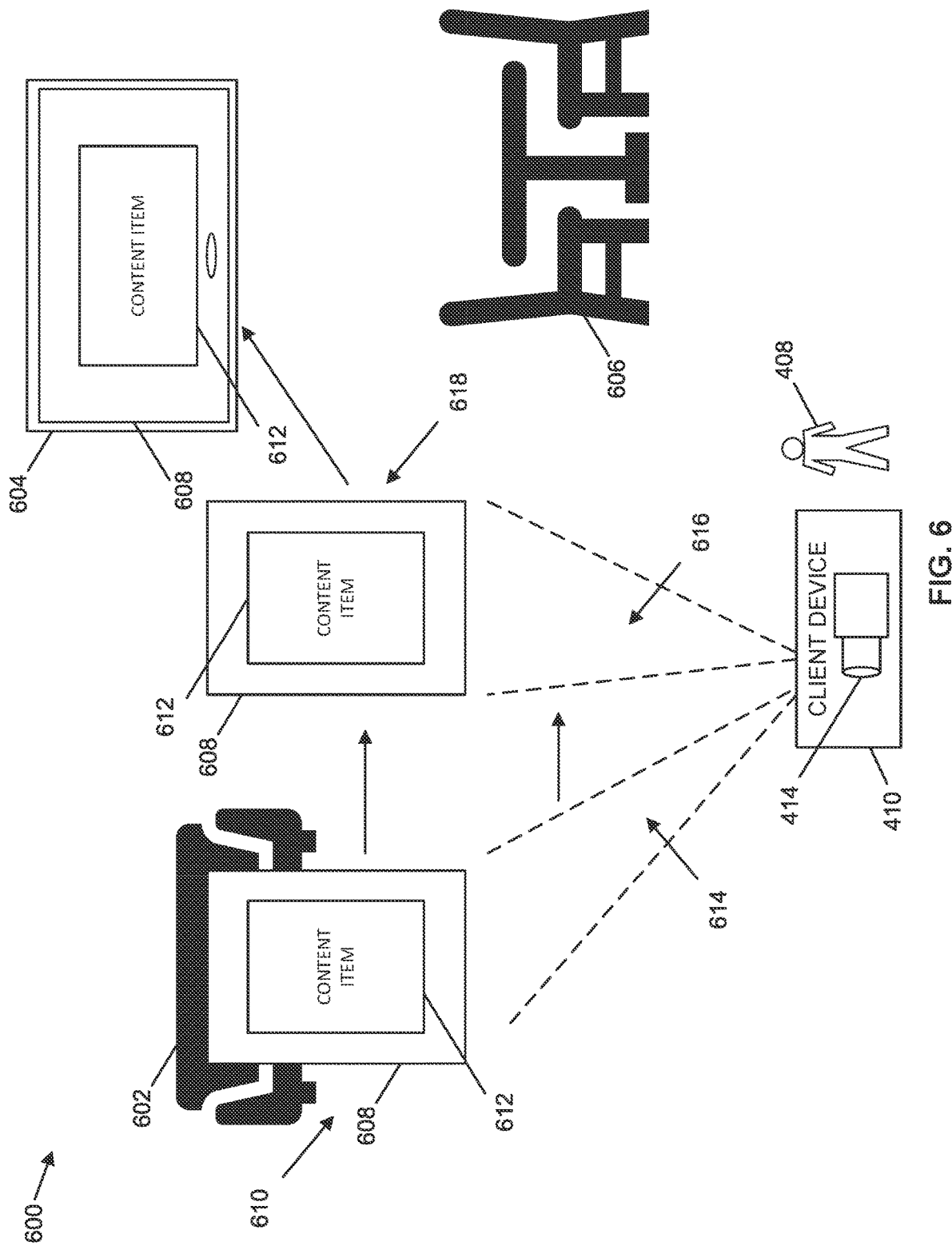
FIG. 6 is diagram showing user interfaces generated by a client device that are displayed in an augmented reality environment, in accordance with one or more examples.

FIG. 6 is a diagram showing user interfaces generated by a client device 410 that are displayed in an augmented reality environment 600, in accordance with one or more examples. The augmented reality environment 600 may include a real-world scene in which a number of objects are located. For example, the augmented reality environment 600 may include a first object 602, a second object 604, and a third object 606. Additionally, the client device 410 and the user 408 may be located in the augmented reality environment 600.

The client device 410 may cause one or more user interfaces to be displayed at one or more locations in the augmented reality environment 600. In the illustrative example of FIG. 6, a user interface 608 is displayed at a first location 610 within the augmented reality environment 600.

The first location 610 may be characterized according to first real-world coordinates. The user interface 608 may display content corresponding to a content item 612. In one or more examples, the user interface 608 may be displayed within a first field of view 614 of the user 408. As the gaze of the user 408 shifts to a second field of view 616, the user interface 608 may be displayed at a second location 618 within the augmented reality environment 600. The second location 618 may be characterized according to second real-world coordinates.

In at least some examples, the location of the user interface 608 within the augmented reality environment 600 may be fixed in response to one or more commands from the user 408. In various examples, the location of the user interface 608 within the augmented reality environment 600 may be fixed for a period of time. In one or more additional examples, the location of the user interface 608 within the augmented reality environment 600 may be fixed until a command is received indicating that the location of the user interface 608 may move in relation to the gaze of the user 408. In one or more further examples, the location of the user interface 608 within the augmented reality environment 600 may correspond to a location of an object located in the augmented reality environment 600. For example, the user interface 608 is displayed at the location of the second object 604. In one or more illustrative examples, the location of the user interface 608 may move from the second location 618 to the location of the second object 604 in response to one or more commands of the user 408. In one or more additional illustrative examples, the user interface 608 may be displayed at the location of the second object 604 based on one or more features of the content item 612. To illustrate, the user interface 608 may be displayed at the location of the second object 604 based on the content item 612 including video content.

Figure 7:
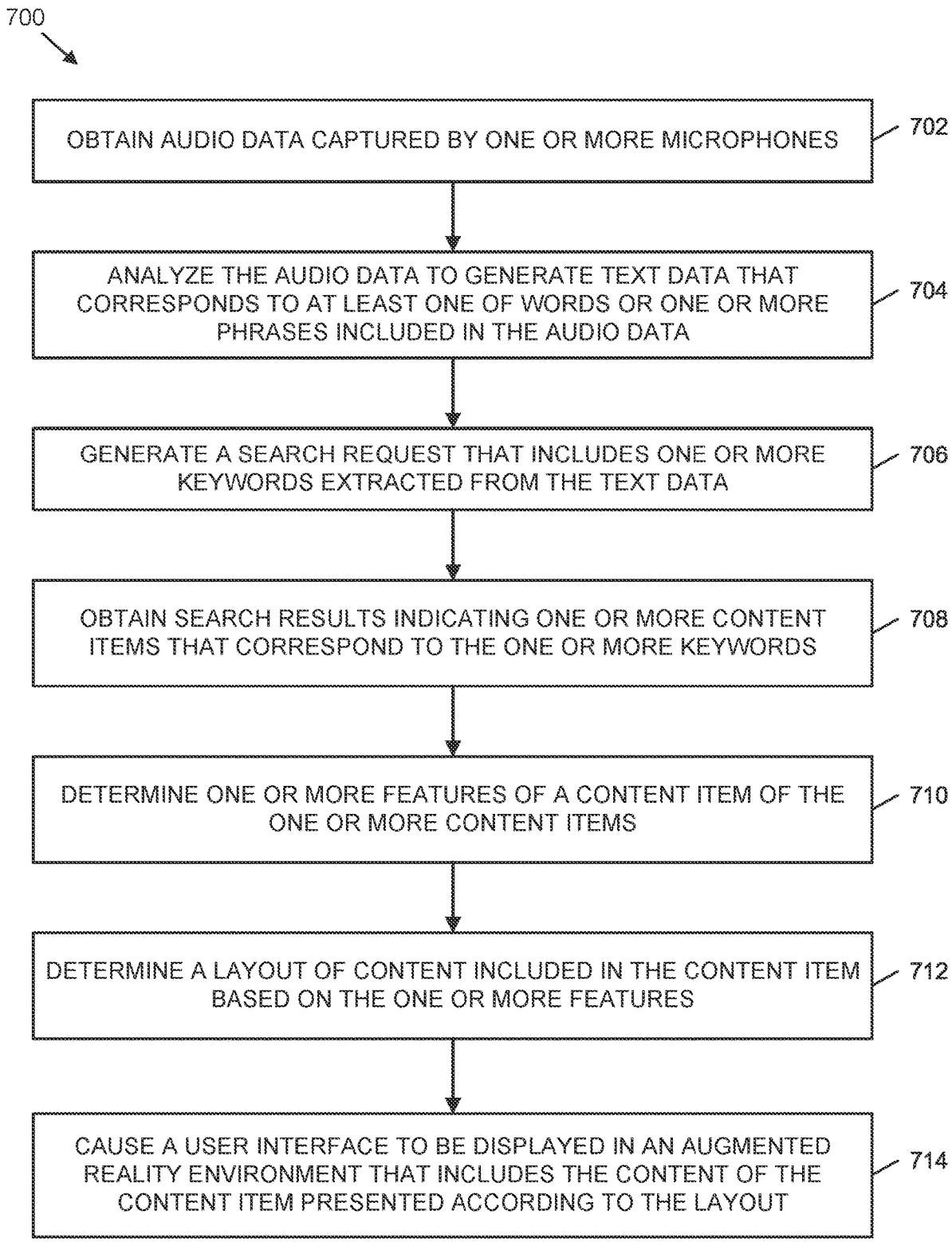
FIG. 7 is a flow diagram of a process to determine an arrangement of information in a user interface displayed in an augmented reality environment, in accordance with one or more examples.

FIG. 7 illustrates a flowchart of an example process 700 to determine an arrangement of information in a user interface displayed in an augmented reality environment, in accordance with one or more examples. Implementations of the process 700 may be embodied in computer-readable instructions for execution by one or more processors such that the operations of the processes may be performed in part or in whole by the functional components of at least one of one or more client devices or one or more server systems. Accordingly, the processes described below are by way of example with reference thereto, in some situations. However, in other implementations, at least some of the operations of the example processes described with respect to FIG. 7 may be deployed on various other hardware configurations. The example processes described with respect to FIG. 7 are therefore not intended to be limited to being performed by one or more server systems or one or more client devices described herein and can be implemented in whole, or in part, by one or more additional components. Although the described flowcharts can show operations as a sequential process, many of the operations can be performed in parallel or concurrently. In addition, the order of the operations may be rearranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

The process 700 may include, at operation 702, obtaining audio data captured by one or more microphones. In one or more examples, the audio data may be produced by an individual that is a user of a client application. For example, the individual has an account with a service provider that at least one of controls, maintains, or creates the client application. In various examples, a client device executing an instance of the client application may be operated by the individual. The one or more microphones may be located in a client device operated by the individual. In one or more illustrative examples, the client device may include a head-worn device, such as the glasses 100. The one or more microphones may be located in the head-worn device. In one or more additional examples, at least a portion of the one or more microphones may be placed in a location within an augmented reality environment that is external with respect to the head-worn device. Further, the head-worn device may include one or more cameras to capture at least one of image content or video content of a real-world scene.

In addition, the process 700 may include, at operation 704, analyzing the audio data to generate text data that corresponds to at least one of one or more words or one or more phrases included in the audio data. At operation 706, the process 700 may include generating a search request that includes one or more keywords extracted from the text data. In one or more examples, the search request may be sent to a content source to process the search request and generate search results based on the one or more keywords included in the search request. In various examples, a content source may be specified in the search request. For example, the one or more keywords indicate a content source for the search request. In one or more additional examples, the one or more keywords may be analyzed to determine a content source to send the search request. To illustrate, search requests directed to video content may be sent to a source of video content. Additionally, search requests directed to at least one of products or services may be sent to an ecommerce content source. Further, search requests related to social media content may be sent to a social media content source. In various examples, the search request may be sent to multiple content sources.

The process 700 may also include, at operation 708, obtaining search results indicating one or more content items that correspond to the one or more keywords of the search request. Individual content items included in the search results may include at least one of text content, video content, image content, audio content, or augmented reality content. Further, the process 700 may include, at operation 710, determining one or more features of a content item of the one or more content item. The one or more features may include at least one of a source of the content item or a format of the content item. In one or more examples, content included in the one or more content items may be analyzed to determine one or more formats of content included in the one or more content items. For example, the one or more content items are analyzed to determine whether the one or more content items include at least one of text content, video content, image content, or augmented reality content.

In various examples, respective sources of the one or more content items may be indicated in metadata obtained in relation to the one or more content items. In these scenarios, a source of a content item is extracted from the metadata associated with the content item. Additionally, a source of the content item may also be determined based on an analysis of one or more features of the content item. To illustrate, content items obtained from an ecommerce source may include a first set of features, content items obtained from a media content provider may include a second set of features, and content items obtained from a social network content provider may include a third set of features.

The process 700 may also include, at operation 712, determining a layout of content included in the content item based on the one or more features of the content item. In one or more examples, the one or more features of a content item may be analyzed with respect to a plurality of sets of features corresponding to a plurality of content templates to determine a measure of similarity between the one or more features of the content item and one or more sets of features of the plurality of sets of features of the content templates. Individual content templates of the plurality of content templates may indicate a respective arrangement of content within one or more user interfaces. For example, individual content templates indicate at least one of one or more first sections of a user interface to display text content, one or more second sections of a user interface to display video content, one or more third sections of a user interface to display image content, or one or more fourth sections of a user interface to display augmented reality content. In various examples, a content template may be selected from among the plurality of content templates based on the measure of similarity. In one or more illustrative examples, a number of measures of similarity may be determined based on the one or more features of the content item with respect to the features associated with individual content templates.

In one or more illustrative examples, a content template corresponding to a highest measure of similarity may be selected. In one or more additional illustrative examples, a template corresponding to a measure of similarity that is at least a threshold measure of similarity may be selected. In various examples, the content template selected may be based on a source of the content item. Further, the content template selected may be based on one or more content formats included in the content item. For example, a first template is selected to display content of a content item that includes text content, and a second template may be selected to display content of a content item that includes both text content and at least one of video content or image content.

Additionally, at operation 714, the process 700 may include causing a user interface to be displayed in an augmented reality environment that includes the content of the content item presented according to the layout. The augmented reality environment may include a real-world scene and the user interface is displayed with respect to a location in the real-world scene. In one or more examples, a field of view of a gaze of an individual may be determined. For example, a field of view of a gaze of a user of the client application is determined. In various examples, a location within a real-world scene to display the user interface may be determined that corresponds to the field of view of the gaze of the individual. In one or more illustrative examples, the field of view of the gaze of the individual may be determined based on camera data from one or more cameras included in the augmented reality environment. In one or more additional illustrative examples, the field of view of the gaze of the individual may be determined based on sensor data from one or more inertial measurement unit sensors included in the augmented reality environment. In at least some examples, at least one of the camera data or the sensor data may be captured by a head-worn device that is worn by the individual. In one or more examples, the location of the user interface may change based on the changes to the field of view of the individual. For example, the field of view of the gaze of the individual changes from a first location to a second location. In these scenarios, the location of the user interface within the real-world scene moves from the first location to the second location. In one or more further examples, the user interface may be displayed in relation to a location of an object included in the augmented reality environment.

In one or more examples, one or more commands may be obtained in relation to the data displayed in the user interface. The one or more commands may be audible commands. The one or more commands may also correspond to one or more gestures made by the individual. In at least some examples, the one or more commands may be conveyed in relation to one or more gestures and one or more audible words. In situations where one or more commands correspond to audible words or phrases, additional audio data captured by the one or more microphones is analyzed to generate additional text data that corresponds to at least one of one or more additional words or one or more additional phrases included in the additional audio data. The additional words or the additional phrases included in the additional text data that correspond to commands may be different than the words or phrases included in the text data that correspond to generated search requests. The additional text data may then be analyzed to identify one or more commands included in the text data. In various examples, at least one of the one or more additional words or the one or more additional phrases may be analyzed with respect to at least one of one or more words or one or more phrases of at least one command to determine a measure of similarity. In this way, a command may be determined based on a value of the measure of similarity.

In one or more illustrative examples, the one or more commands may correspond to fixing a location of the user interface at a location within a real-world scene. In these scenarios, when a field of view of a gaze of the individual changes from a first location to a second location, the location of the user interface within the real-world scene remains the same. In one or more additional illustrative examples, the one or more commands may correspond to modifying a display characteristic of the content item. For example, a command causes an appearance of the content item within the user interface to be modified. To illustrate, a magnification level of at least one of text content, image content, video content, or augmented reality content of the content item may be modified based on a command to modify a display characteristic of the content item.

In various examples, the one or more commands may be related to the selection of one or more user interface elements included in the user interface. In one or more illustrative examples, at least a portion of the one or more user interface elements may correspond to options included in a menu displayed in the user interface. In one or more additional illustrative examples, at least a portion of the one or more user interface elements may correspond to content items included in search results. In one or more further illustrative examples, at least a portion of the one or more user interface elements may correspond to at least a portion of the content of the content item.

In one or more examples, a user interface element may be selected based on a field of view of a gaze of the individual. For example, the field of view of the gaze of the individual corresponds to a given user interface element. In various examples, an appearance of a user interface element may change in response to the user interface element being within the field of view of the gaze of the individual. In one or more illustrative examples, an appearance of a user interface element may be modified in response to determining that at least a threshold amount of the user interface element is within a center portion of the field of view of the gaze of the individual. In situations where an appearance of a user interface element is modified due to the user interface element being within the field of view of the gaze of the individual, one or more commands may be obtained with respect to the user interface element. To illustrate, a user interface element may be selected based on one or more commands when the user interface element is within at least a threshold amount of a center of the field of view of the gaze of the individual. In at least some examples, one or more actions may be performed in response to selection of a user interface element. For example, a content item is selected from among a list of content items in response to the one or more commands and content corresponding to the content item may be displayed in the user interface.

In one or more examples, at least a portion of the operations described with respect to FIG. 7 may be performed in response to launching an augmented reality content item that is executing within a client application. The augmented reality content item may include computer-readable code that executes within the client application. In one or more examples, after launching the augmented reality content item, the audio data obtained in relation to operation 702 may be captured and operations 704, 706, 708, 710, 712, and 714, as well as other operations described with respect to FIG. 7, may be performed while the augmented reality content item is executing within the client application.

In one or more additional examples, at least a portion of the operations described with respect to FIG. 7 may be performed in response to one or more activation actions performed by an individual, such as a user of a head-worn device. For example, the audio data obtained with respect to operation 702 is captured and operations 704, 706, 708, 710, 712, and 714, as well as other operations described with respect to FIG. 7, may be performed in response to one or more activation words or one or more activation phrases spoken by the user. In one or more additional examples, the audio data obtained with respect to operation 702 may be captured and operations 704, 706, 708, 710, 712, and 714, as well as other operations described with respect to FIG. 7, may be performed in response to one or more activation gestures or one or more other activation inputs provided by the user.

Figure 8:
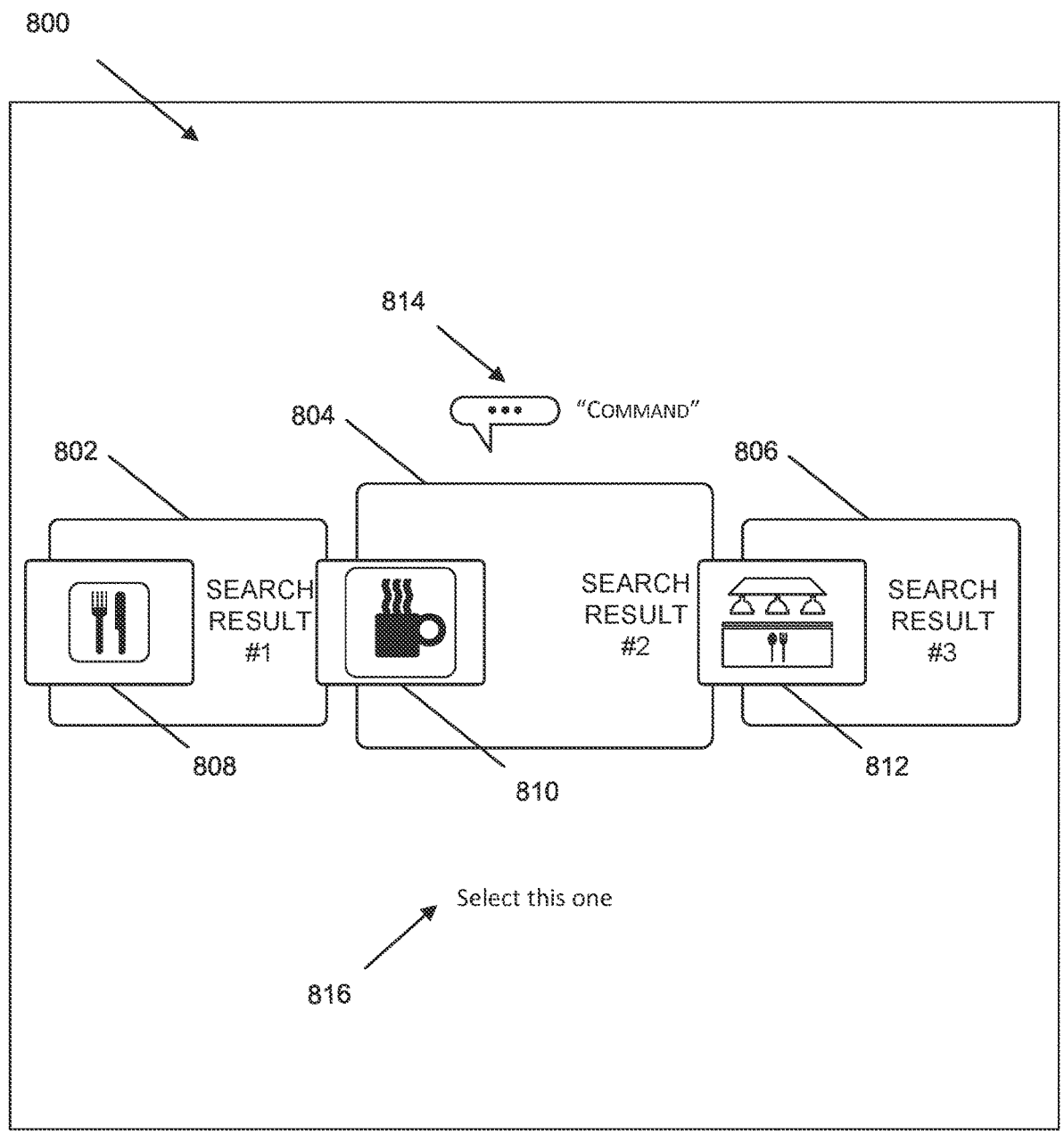
FIG. 8 is a user interface that includes results of a search request displayed in an augmented reality environment, in accordance with one or more examples.

FIG. 8 is a user interface 800 that includes results of a search request displayed in an augmented reality environment, in accordance with one or more examples. In the illustrative example of FIG. 8, the user interface 800 includes a first search result 802, a second search result 804, and a third search result 806. The search results 802, 804, 806 may be provided in response to a search request having one or more criteria. The first search result 806 may include a first thumbnail image 808 that corresponds to content of the first search result 802. In addition, the second search result 804 may include a second thumbnail image 810 that corresponds to content of the second search result 804. Further, the third search result 806 may include a third thumbnail image 812 that corresponds to content of the third search result 806.

The user interface 800 may also include command text 814. The command text 814 may include at least one of words or phrases that are selectable by a user to perform one or more actions with respect to features of the user interface 800. In at least some examples, the command text 814 may correspond to one or more commands that are currently recognized by the AR content system 402. In the illustrative example of FIG. 8, the command text 814 may correspond to selection of one or more of the search results 802, 804, 806. Additionally, the user interface 800 may include audio input text 816. The audio input text 816 may correspond to audio input provided by a user. To illustrate, as a user provides audio input, text generated by the AR content system 402 based on the audio input may be displayed as the audio input text 816. In this way, a user may see how the AR content system 402 interprets audio input obtained from the user. In the illustrative example of FIG. 8, the audio input text 816 corresponds to selection of a search result 802, 804, 806 by the user.

Further, the user interface 800 may indicate a search result that is a target selection of the user by displaying the targeted selection with visual characteristics that are different from the search results that are not targeted selections. In the illustrative example of FIG. 8, the second search result 804 may be a targeted selection and is displayed larger than the first search result 802 and the third search result 806. Targeted selections may be selected in response to a command from the user. In one or more examples, a targeted selection may be determined based on a gaze of the user. In various examples, as the gaze of the user moves, the targeted selection may also change to correspond to a change in the gaze of the user. In this way, as the gaze of the user shifts from one search result to another search result, the search result that corresponds to a targeted selection may change and the display characteristics of the search results may also change. In at least some examples, multiple targeted selections may be identified by a user. In these scenarios, a command may be provided that indicates multiple selections are to be made and the user may move their gaze to select multiple search results.

Figure 9:
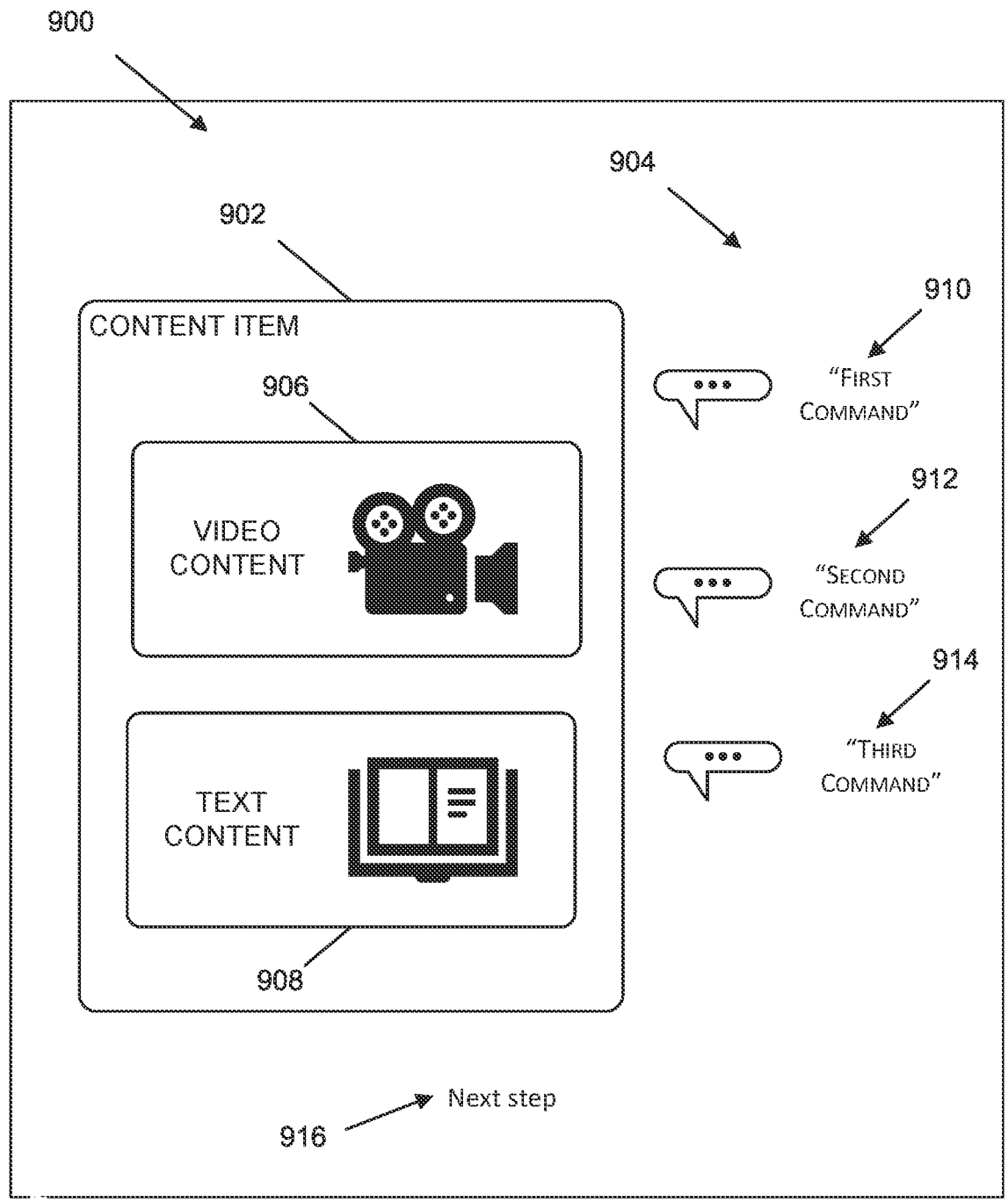
FIG. 9 is a user interface that includes information of a content item and a menu of commands that may be performed in relation to the displaying of the information, in accordance with one or more examples.

FIG. 9 is a user interface 900 that includes information of a content item 902 and a menu 904 including a number of commands that may be performed in relation to the content item 902, in accordance with one or more examples. In the illustrative example of FIG. 9, the content item 902 includes video content 906 and text content 908. Content of the content item 902 may be arranged according to a layout determined by the AR content system 402. For example, the video content 906 is displayed in a first section of the user interface 900 dedicated to videos and the text content 908 may be displayed in a second section of the user interface 900 dedicated to text.

The menu 904 may include first command text 910 that corresponds to a first command that may be provided by a user, second command text 912 that corresponds to a second command that may be provided by a user, and third command text 914 that corresponds to a third command that may be provided by a user. In one or more examples, the menu 904 may indicate one or more commands that correspond to display characteristics of the content item 902. For example, the menu 904 indicates at least one of one or more commands to increase a size of one or more portions of the content item 902 or one or more commands to decrease a size of one or more portions of the content item 902. In scenarios where the content item 902 includes instructional content, the menu 904 may indicate one or more commands to navigate through one or more steps of the instructional content. To illustrate, the menu 904 may indicate at least one of a command to move to a next step of the instructional content or a command to move to a previous step of the instructional content.

The menu 904 may also indicate one or more commands related to the display of the user interface 900 within an augmented reality environment. In one or more examples, the menu 904 may indicate one or more commands to fix a location of the user interface 900 in a real-world scene. In one or more additional examples, the menu 904 may indicate one or more commands to fix a location of the user interface 900 with respect to an object included in a real-world scene. In one or more further examples, the menu 904 may indicate one or more commands to cause the location of the user interface 900 to move in relation to the location of a user. For example, the menu 904 includes one or more commands to cause the user interface 900 to move in relation to a gaze of a user.

Additionally, the user interface 900 may include audio input text 916. The audio input text 916 may correspond to audio input provided by a user. To illustrate, as a user provides audio input, text generated by the AR content system 402 based on the audio input may be displayed as the audio input text 916. In the illustrative example of FIG. 9, the audio input text 916 corresponds to navigating through a number of steps of instructional content.

Figure 10:
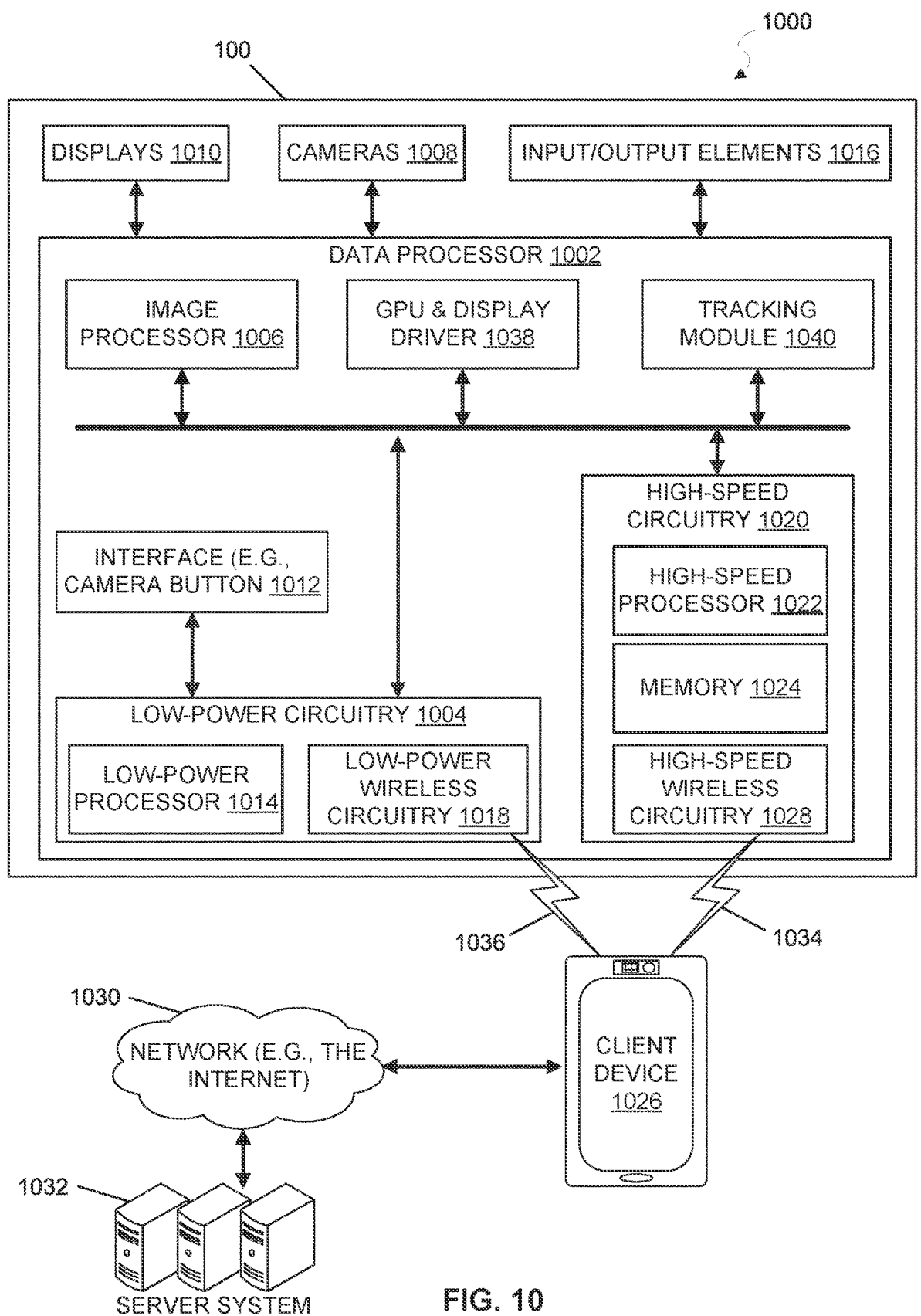
FIG. 10 is a block diagram showing a software architecture within which the present disclosure may be implemented, in accordance with some examples.

FIG. 10 is a block diagram illustrating a networked system 1000 including details of the glasses 100, in accordance with some examples. The networked system 1000 includes the glasses 100, a client device 1026, and a server system 1032. The client device 1026 may be a smartphone, tablet, phablet, laptop computer, access point, or any other such device capable of connecting with the glasses 100 using a low-power wireless connection 1036 and/or a high-speed wireless connection 1034. The client device 1026 is connected to the server system 1032 via the network 1030. The network 1030 may include any combination of wired and wireless connections. The server system 1032 may be one or more computing devices as part of a service or network computing system. The client device 1026 and any elements of the server system 1032 and network 1030 may be implemented using details of the software architecture 1204 or the computing apparatus 300 described in FIG. 12 and FIG. 3 respectively.

The glasses 100 include a data processor 1002, displays 1010, one or more cameras 1008, and additional input/output elements 1016. The input/output elements 1016 may include microphones, audio speakers, biometric sensors, additional sensors, or additional display elements integrated with the data processor 1002. Examples of the input/output elements 1016 are discussed further with respect to FIG. 12 and FIG. 3. For example, the input/output elements 1016 may include any of I/O components 306 including output components 328, motion components 336, and so forth. Examples of the displays 1010 are described in FIG. 2. In the particular examples described herein, the displays 1010 include a display for the user's left and right eyes.

The data processor 1002 includes an image processor 1006 (e.g., a video processor), a GPU & display driver 1038, a tracking module 1040, an interface 1012, low-power circuitry 1004, and high-speed circuitry 1020. The components of the data processor 1002 are interconnected by a bus 1042.

The interface 1012 refers to any source of a user command that is provided to the data processor 1002. In one or more examples, the interface 1012 is a physical button that, when depressed, sends a user input signal from the interface 1012 to a low-power processor 1014. A depression of such button followed by an immediate release may be processed by the low-power processor 1014 as a request to capture a single image, or vice versa. A depression of such a button for a first period of time may be processed by the low-power processor 1014 as a request to capture video data while the button is depressed, and to cease video capture when the button is released, with the video captured while the button was depressed stored as a single video file. Alternatively, depression of a button for an extended period of time may capture a still image. In some examples, the interface 1012 may be any mechanical switch or physical interface capable of accepting user inputs associated with a request for data from the cameras 1008. In other examples, the interface 1012 may have a software component, or may be associated with a command received wirelessly from another source, such as from the client device 1026.

The image processor 1006 includes circuitry to receive signals from the cameras 1008 and process those signals from the cameras 1008 into a format suitable for storage in the memory 1024 or for transmission to the client device 1026. In one or more examples, the image processor 1006 (e.g., video processor) comprises a microprocessor integrated circuit (IC) customized for processing sensor data from the cameras 1008, along with volatile memory used by the microprocessor in operation.

The low-power circuitry 1004 includes the low-power processor 1014 and the low-power wireless circuitry 1018. These elements of the low-power circuitry 1004 may be implemented as separate elements or may be implemented on a single IC as part of a system on a single chip. The low-power processor 1014 includes logic for managing the other elements of the glasses 100. As described above, for example, the low-power processor 1014 may accept user input signals from the interface 1012. The low-power processor 1014 may also be configured to receive input signals or instruction communications from the client device 1026 via the low-power wireless connection 1036. The low-power wireless circuitry 1018 includes circuit elements for implementing a low-power wireless communication system. Bluetooth™ Smart, also known as Bluetooth™ low energy, is one standard implementation of a low power wireless communication system that may be used to implement the low-power wireless circuitry 1018. In other examples, other low power communication systems may be used.

The high-speed circuitry 1020 includes a high-speed processor 1022, a memory 1024, and a high-speed wireless circuitry 1028. The high-speed processor 1022 may be any processor capable of managing high-speed communications and operation of any general computing system used for the data processor 1002. The high-speed processor 1022 includes processing resources used for managing high-speed data transfers on the high-speed wireless connection 1034 using the high-speed wireless circuitry 1028. In some examples, the high-speed processor 1022 executes an operating system such as a LINUX operating system or other such operating system such as the operating system 1212 of FIG. 12. In addition to any other responsibilities, the high-speed processor 1022 executing a software architecture for the data processor 1002 is used to manage data transfers with the high-speed wireless circuitry 1028. In some examples, the high-speed wireless circuitry 1028 is configured to implement Institute of Electrical and Electronic Engineers (IEEE) 802.11 communication standards, also referred to herein as Wi-Fi. In other examples, other high-speed communications standards may be implemented by the high-speed wireless circuitry 1028.

The memory 1024 includes any storage device capable of storing camera data generated by the cameras 1008 and the image processor 1006. While the memory 1024 is shown as integrated with the high-speed circuitry 1020, in other examples, the memory 1024 may be an independent standalone element of the data processor 1002. In some such examples, electrical routing lines may provide a connection through a chip that includes the high-speed processor 1022 from image processor 1006 or the low-power processor 1014 to the memory 1024. In other examples, the high-speed processor 1022 may manage addressing of the memory 1024 such that the low-power processor 1014 will boot the high-speed processor 1022 any time that a read or write operation involving the memory 1024 is desired.

The tracking module 1040 estimates a pose of the glasses 100. For example, the tracking module 1040 uses image data and associated inertial data from the cameras 1008 and the position components 340, as well as GPS data, to track a location and determine a pose of the glasses 100 relative to a frame of reference (e.g., real-world scene environment). The tracking module 1040 continually gathers and uses updated sensor data describing movements of the glasses 100 to determine updated three-dimensional poses of the glasses 100 that indicate changes in the relative position and orientation relative to physical objects in the real-world scene environment. The tracking module 1040 permits visual placement of virtual objects relative to physical objects by the glasses 100 within the field of view of the user via the displays 1010.

The GPU & display driver 1038 may use the pose of the glasses 100 to generate frames of virtual content or other content to be presented on the displays 1010 when the glasses 100 are functioning in a traditional augmented reality mode. In this mode, the GPU & display driver 1038 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 1026, or on a remote server. For example, one or more functions or operations described herein may be performed by one of the applications 1206 such as messaging Application 1246.

Figure 11:
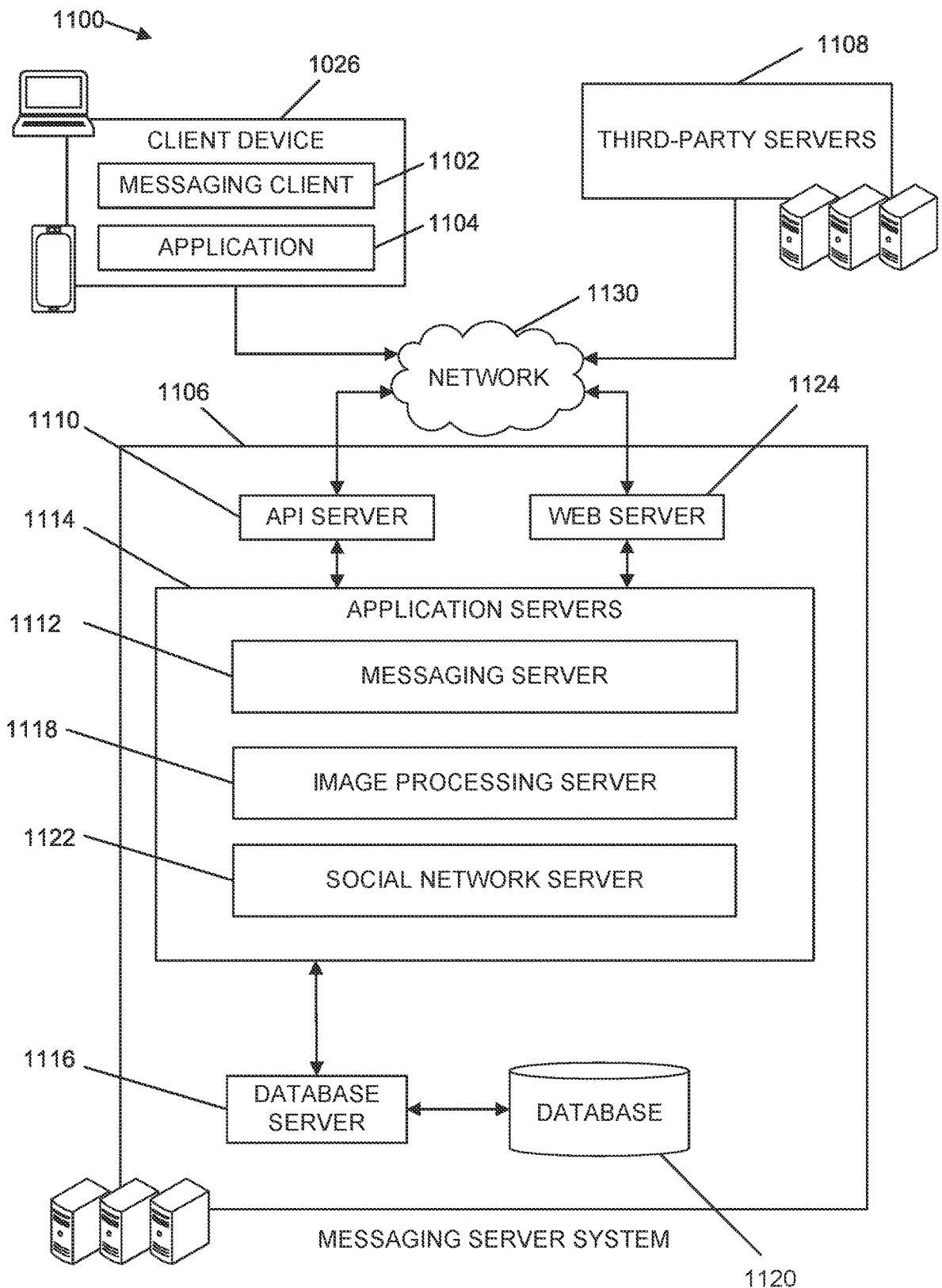
FIG. 11 is a block diagram illustrating details of the head-worn device of FIG. 1, in accordance with some examples.

FIG. 11 is a block diagram showing an example messaging system 1100 for exchanging data (e.g., messages and associated content) over a network. The messaging system 1100 includes multiple instances of a client device 1026 which host a number of applications, including a messaging client 1102 and other Applications 1104. A messaging client 1102 is communicatively coupled to other instances of the messaging client 1102 (e.g., hosted on respective other client devices 1026), a messaging server system 1106 and third-party servers 1108 via a network 1030 (e.g., the Internet). A messaging client 1102 can also communicate with locally-hosted Applications 1104 using Application Program Interfaces (APIs).

A messaging client 1102 is able to communicate and exchange data with other messaging clients 1102 and with the messaging server system 1106 via the network 1030. The data exchanged between messaging clients 1102, and between a messaging client 1102 and the messaging server system 1106, includes functions (e.g., commands to invoke functions) as well as payload data (e.g., text, audio, video or other multimedia data).

The messaging server system 1106 provides server-side functionality via the network 1030 to a particular messaging client 1102. While some functions of the messaging system 1100 are described herein as being performed by either a messaging client 1102 or by the messaging server system 1106, the location of some functionality either within the messaging client 1102 or the messaging server system 1106 may be a design choice. For example, it may be technically preferable to initially deploy some technology and functionality within the messaging server system 1106 but to later migrate this technology and functionality to the messaging client 1102 where a client device 1026 has sufficient processing capacity.

The messaging server system 1106 supports various services and operations that are provided to the messaging client 1102. Such operations include transmitting data to, receiving data from, and processing data generated by the messaging client 1102. This data may include message content, client device information, geolocation information, media augmentation and overlays, message content persistence conditions, social network information, and live event information, as examples. Data exchanges within the messaging system 1100 are invoked and controlled through functions available via user interfaces (UIs) of the messaging client 1102.

Turning now specifically to the messaging server system 1106, an Application Program Interface (API) server 1110 is coupled to, and provides a programmatic interface to, application servers 1114. The application servers 1114 are communicatively coupled to a database server 1116, which facilitates access to a database 1120 that stores data associated with messages processed by the application servers 1114. Similarly, a web server 1124 is coupled to the application servers 1114, and provides web-based interfaces to the application servers 1114. To this end, the web server 1124 processes incoming network requests over the Hypertext Transfer Protocol (HTTP) and several other related protocols.

The Application Program Interface (API) server 1110 receives and transmits message data (e.g., commands and message payloads) between the client device 1026 and the application servers 1114. Specifically, the Application Program Interface (API) server 1110 provides a set of interfaces (e.g., routines and protocols) that can be called or queried by the messaging client 1102 in order to invoke functionality of the application servers 1114. The Application Program Interface (API) server 1110 exposes various functions supported by the application servers 1114, including account registration, login functionality, the sending of messages, via the application servers 1114, from a particular messaging client 1102 to another messaging client 1102, the sending of media files (e.g., images or video) from a messaging client 1102 to a messaging server 1112, and for possible access by another messaging client 1102, the settings of a collection of media data (e.g., story), the retrieval of a list of friends of a user of a client device 1026, the retrieval of such collections, the retrieval of messages and content, the addition and deletion of entities (e.g., friends) to an entity graph (e.g., a social graph), the location of friends within a social graph, and opening an application event (e.g., relating to the messaging client 1102).

The application servers 1114 host a number of server applications and subsystems, including for example a messaging server 1112, an image processing server 1118, and a social network server 1122. The messaging server 1112 implements a number of message processing technologies and functions, particularly related to the aggregation and other processing of content (e.g., textual and multimedia content) included in messages received from multiple instances of the messaging client 1102. As will be described in further detail, the text and media content from multiple sources may be aggregated into collections of content (e.g., called stories or galleries). These collections are then made available to the messaging client 1102. Other processor and memory intensive processing of data may also be performed server-side by the messaging server 1112, in view of the hardware requirements for such processing.

The application servers 1114 also include an image processing server 1118 that is dedicated to performing various image processing operations, typically with respect to images or video within the payload of a message sent from or received at the messaging server 1112.

The social network server 1122 supports various social networking functions and services and makes these functions and services available to the messaging server 1112. To this end, the social network server 1122 maintains and accesses an entity graph within the database 1120. Examples of functions and services supported by the social network server 1122 include the identification of other users of the messaging system 1100 with which a particular user has relationships or is "following," and also the identification of other entities and interests of a particular user.

The messaging client 1102 can notify a user of the client device 1026, or other users related to such a user (e.g., "friends"), of activity taking place in shared or shareable sessions. For example, the messaging client 1102 can provide participants in a conversation (e.g., a chat session) in the messaging client 1102 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 12:
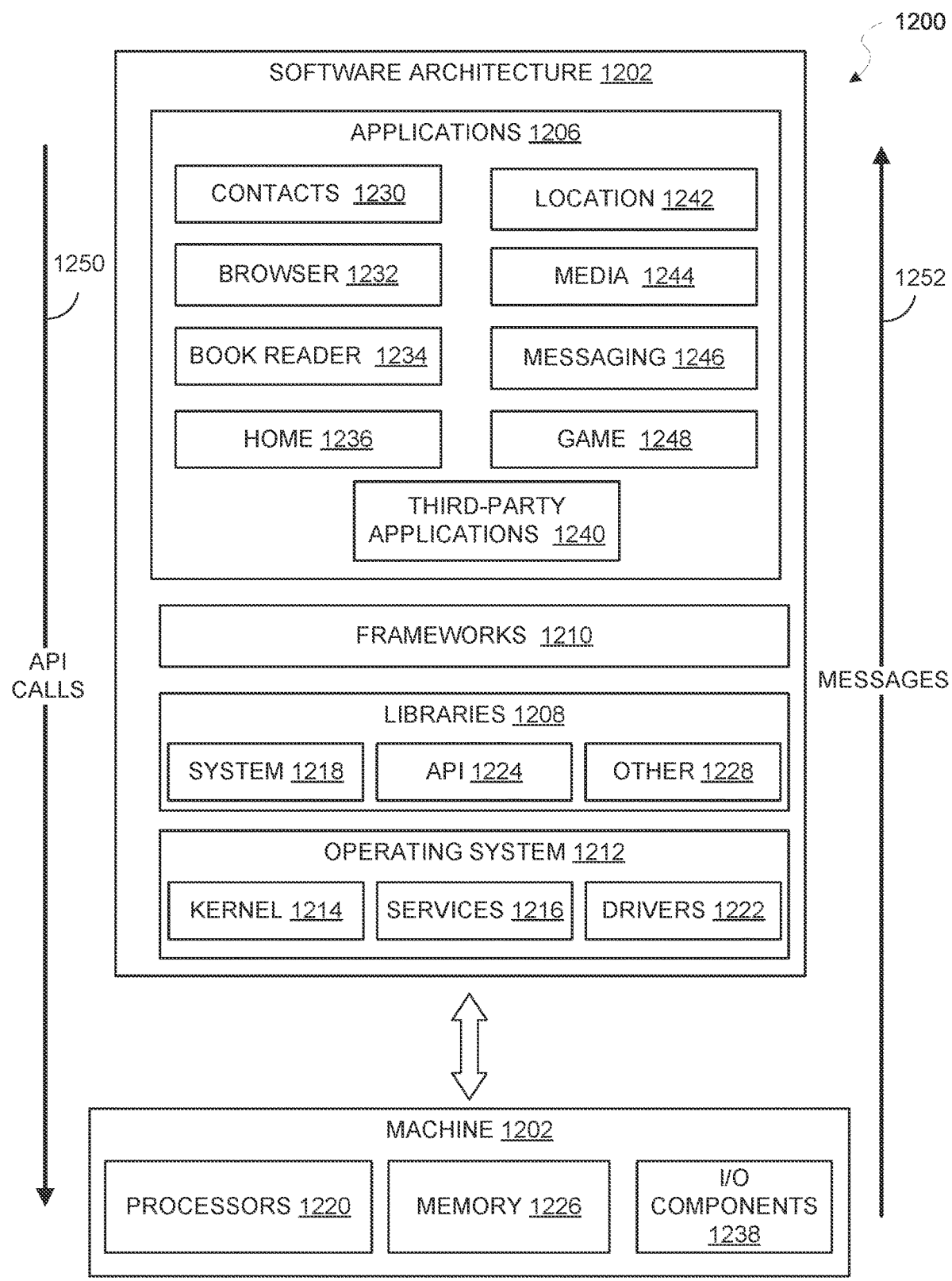
FIG. 12 is a diagrammatic representation of a networked environment in which the present disclosure may be deployed, in accordance with some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where individual layers provide a particular functionality. The software architecture 1204 includes layers such as an operating system 1212, libraries 1208, frameworks 1210, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1208 provide a low-level common infrastructure used by the applications 1206. The libraries 1208 can include system libraries 1218 (e.g., C standard library) that provide functions such as memory allocation functions, string manipulation functions, mathematic functions, and the like. In addition, the libraries 1208 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1208 can also include a wide variety of other libraries 1228 to provide many other APIs to the applications 1206.

The frameworks 1210 provide a high-level common infrastructure that is used by the applications 1206. For example, the frameworks 1210 provide various graphical user interface (GUI) functions, high-level resource management, and high-level location services. The frameworks 1210 can provide a broad spectrum of other APIs that can be used by the applications 1206, some of which may be specific to a particular operating system or platform.

In an example, the applications 1206 may include a home Application 1236, a contacts Application 1230, a browser Application 1232, a book reader Application 1234, a location Application 1242, a media Application 1244, a messaging Application 1246, a game Application 1248, and a broad assortment of other applications such as third-party applications 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks, magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
    obtaining, by a computing system comprising one or more processors and memory, audio data captured by one or more microphones;
    analyzing, by the computing system, the audio data to generate text data that corresponds to at least one of one or more words or one or more phrases included in the audio data;
    generating, by the computing system, a search request that includes one or more keywords extracted from the text data;
    obtaining, by the computing system, search results indicating one or more content items that correspond to the one or more keywords of the search request;
    determining, by the computing system, one or more features of a content item of the one or more content items, the one or more features including at least one of a source of the content item or one or more formats of the content item, the one or more formats of the content item including at least one of text content, image content, video content, or augmented reality content;
    analyzing, by the computing system, the one or more features of the content item with respect to individual feature sets of individual content templates of a plurality of content templates to determine individual measures of similarity between the one or more features of the content item and the individual feature sets of the individual content templates, the individual content templates indicating a respective arrangement of content within one or more user interfaces;
    determining, by the computing system and based on the individual measures of similarity, a content template of the plurality of content templates by which to display the content of the content item;
    determining, by the computing system, a layout of content included in the content item based on the content template; and
    causing, by the computing system, a user interface to be displayed in an augmented reality environment, the user interface including the content of the content item presented according to the layout.

2. The computer-implemented method of claim 1, comprising:
    determining, by the computing system, a field of view of a gaze of an individual; and
    determining, by the computing system, a location within a real-world scene to display the user interface, the location corresponding to at least a portion of the field of view of the gaze of the individual.

3. The computer-implemented method of claim 2, comprising:
    obtaining, by the computing system, camera data from one or more cameras included in the augmented reality environment;
    obtaining, by the computing system, sensor data from one or more inertial measurement unit sensors included in the augmented reality environment; and
    analyzing, by the computing system, at least one of the camera data or the sensor data to determine the field of view of the gaze of the individual.

4. The computer-implemented method of claim 2, comprising:
    determining, by the computing system, that the field of view of the gaze of the individual has changed from a first location to a second location; and
    causing, by the computing system, the location to display the user interface within the real-world scene to move from the first location to the second location.

5. The computer-implemented method of claim 2, comprising:

obtaining, by the computing system, additional audio data captured by the one or more microphones; and analyzing, by the computing system, the additional audio data to generate additional text data that corresponds to at least one of one or more additional words or one or more additional phrases included in the additional audio data.

6. The computer-implemented method of claim 5, comprising:

determining, by the computing system, that the additional text data includes a command to fix the location of the user interface within the real-world scene;

determining, by the computing system, that the field of view of the gaze of the individual has changed from a first location to a second location; and causing, by the computing system, the user interface to remain displayed in the location.

7. The computer-implemented method of claim 5, comprising:

determining, by the computing system, that the additional text data includes a command to modify a display characteristic of the content item; and modifying, by the computing system, an appearance of the content item within the user interface based on the command to modify the display characteristic.

8. The computer-implemented method of claim 1, comprising:

obtaining, by the computing system, camera data from one or more cameras included in the augmented reality environment;

analyzing, by the computing system, the camera data to determine one or more objects located in the augmented reality environment; and causing, by the computing system, the user interface to be displayed in a location of an object of the one or more objects.

9. The computer-implemented method of claim 1, comprising:

causing, by the computing system, an additional user interface to be displayed in the augmented reality environment, the additional user interface including a first user interface element that corresponds to a first content item of the one or more content items and a second user interface element that corresponds to a second content item of the one or more content items;

obtaining, by the computing system, camera data from one or more cameras included in the augmented reality environment;

obtaining, by the computing system, sensor data from one or more inertial measurement unit sensors included in the augmented reality environment;

analyzing, by the computing system, at least one of the camera data or the sensor data to determine a field of view of a gaze of an individual;

determining, by the computing system, that the field of view of the gaze of the individual corresponds to a location of the first user interface element; and modifying, by the computing system, one or more display characteristics of the first user interface element.

10. The computer-implemented method of claim 9, comprising:

obtaining, by the computing system, additional audio data captured by the one or more microphones;

analyzing, by the computing system, the additional audio data to generate additional text data that corresponds to at least one of one or more additional words or one or more additional phrases included in the additional audio data;

determining, by the computing system, that the additional text data includes a command to access content of at least one content item;

determining, by the computing system, that the first user interface element has been selected based on a location of the field of view of the gaze of the individual and based on the command; and causing, by the computing system, a further user interface to be displayed in the augmented reality environment, the further user interface including content of the first content item.

11. A computing apparatus comprising:

one or more processors; and a memory storing instructions that, when executed by the one or more processors, cause the computing apparatus to perform operations comprising:

obtaining audio data captured by one or more microphones;

analyzing the audio data to generate text data that corresponds to at least one of one or more words or one or more phrases included in the audio data;

generating a search request that includes one or more keywords extracted from the text data;

obtaining search results indicating one or more content items that correspond to the one or more keywords of the search request;

determining one or more features of a content item of the one or more content items, the one or more features including at least one of a source of the content item or one or more formats of the content item, the one or more formats of the content item including at least one of text content, image content, video content, or augmented reality content;

analyzing the one or more features of the content item with respect to individual feature sets of individual content templates of a plurality of content templates to determine individual measures of similarity between the one or more features of the content item and the individual feature sets of the individual content templates, the individual content templates indicating a respective arrangement of content within one or more user interfaces;

determining, based on the individual measures of similarity, a content template of the plurality of content templates by which to display the content of the content item;

determining a layout of content included in the content item based on the content template; and causing a user interface to be displayed in an augmented reality environment, the user interface including the content of the content item presented according to the layout.

12. The computing apparatus of claim 11, wherein the memory stores additional instructions that, when executed by the one or more processors, causes the computing apparatus to perform additional operations comprising:

determining a ranking of the individual measures of similarity;

wherein the content template corresponds to an individual measure of similarity having a highest ranking.

13. The computing apparatus of claim 11, the memory stores additional instructions that, when executed by the one or more processors, causes the computing apparatus to perform additional operations comprising:

analyzing the one or more features of the content item to determine the source of the content item; and determining a content template from among a plurality of content templates based on the source of the content item, wherein the content template indicates a respective arrangement of the content of the content item within the user interface.

14. The computing apparatus of claim 11, wherein the content template indicates a first section of the user interface to display text content and a second section of the user interface to display at least one of image content or video content.

15. The computing apparatus of claim 11, wherein:

the content item includes instructional content, the instructional content indicating a number of steps of an instructional process; and the memory stores additional instructions that, when executed by the one or more processors, causes the computing apparatus to perform additional operations comprising:

analyzing the content item to determine a number of discrete portions of the content item that correspond to individual steps of the number of steps of the instructional process; and generating a plurality of user interfaces such that individual user interfaces of the plurality of user interfaces include content corresponding to an individual step of the instructional process.

16. The computing apparatus of claim 15, wherein:

the user interface includes first content of the content item that corresponds to a first step of the instructional process; and the memory stores additional instructions that, when executed by the one or more processors, causes the computing apparatus to perform additional operations comprising:

obtaining additional audio data captured by the one or more microphones;

analyzing the additional audio data to generate additional text data that corresponds to at least one of one or more additional words or one or more additional phrases included in the additional audio data;

determining that the additional text data includes a command to navigate to a second step of the instructional process; and causing an additional user interface to be displayed in the augmented reality environment, the additional user interface including additional content of the content item that corresponds to the second step of the instructional process.

17. The computing apparatus of claim 11, wherein the memory stores additional instructions that, when executed by the one or more processors, causes the computing apparatus to perform additional operations comprising:

obtaining additional audio data captured by the one or more microphones;

analyzing the additional audio data to generate additional text data that corresponds to at least one of one or more additional words or one or more additional phrases included in the additional audio data;

analyzing the additional text data to determine a plurality of measures of similarity between at least one of the one or more additional words or the one or more additional phrases and one or more words of a plurality of commands;

determining, based on a measure of similarity of the plurality of measures of similarity, that the additional text data corresponds to a command of the plurality of commands; and causing an action that corresponds to the command to be performed.

18. One or more non-transitory computer-readable storage media including computer-readable instructions that, when executed by one or more hardware processors, cause the one or more hardware processors to perform operations comprising:

obtaining audio data captured by one or more microphones;

analyzing the audio data to generate text data that corresponds to at least one of one or more words or one or more phrases included in the audio data;

generating a search request that includes one or more keywords extracted from the text data;

obtaining search results indicating one or more content items that correspond to the one or more keywords of the search request;

determining one or more features of a content item of the one or more content items, the one or more features including at least one of a source of the content item or one or more formats of the content item, the one or more formats of the content item including at least one of text content, image content, video content, or augmented reality content;

analyzing the one or more features of the content item with respect to individual feature sets of individual content templates of a plurality of content templates to determine individual measures of similarity between the one or more features of the content item and the individual feature sets of the individual content templates, the individual content templates indicating a respective arrangement of content within one or more user interfaces;

determining based on the individual measures of similarity, a content template of the plurality of content templates by which to display the content of the content item;

determining a layout of content included in the content item based on the content template; and causing a user interface to be displayed in an augmented reality environment, the user interface including the content of the content item presented according to the layout.

19. The one or more non-transitory computer-readable storage media of claim 18, wherein:

the user interface includes a menu of commands, the menu of commands including a plurality of commands that are selectable to perform one or more actions with respect to the content item; and the one or more non-transitory computer-readable storage media include additional computer-readable instructions that, when executed by one or more hardware processors, cause the one or more hardware processors to perform additional operations comprising:

analyzing additional audio data to generate additional text data that corresponds to at least one of one or more additional words or one or more additional phrases included in the additional audio data;

determining that the additional text data corresponds to a command of the plurality of commands; and causing an action that corresponds to the command to be performed with respect to the content of the content item.

20. The one or more non-transitory computer-readable storage media of claim 19, comprising additional computer-readable instructions that, when executed by one or more hardware processors, cause the one or more hardware processors to perform additional operations comprising:
    causing the menu of commands to be displayed in a first section of the user interface, one or more user interface elements corresponding to the one or more content items to be displayed in a second section of the user interface, and one or more words of the text data to be displayed in a third section of the user interface.

* * * * *